United States Patent
Tatsuoka et al.

[11] Patent Number: 5,854,446
[45] Date of Patent: Dec. 29, 1998

[54] COMBINATIONAL WEIGHING OR COUNTING METHOD AND APPARATUS THEREFOR WITH HIGHLY ACCURATE COMBINATION RESULT

[75] Inventors: Masahiko Tatsuoka; Toshiyuki Komatsu, both of Shiga, Japan

[73] Assignee: Ishida Co., Ltd., Kyoto, Japan

[21] Appl. No.: 943,228

[22] Filed: Oct. 6, 1997

Related U.S. Application Data

[63] Continuation of Ser. No. 300,347, Sep. 2, 1994, abandoned.

[30] Foreign Application Priority Data

Sep. 8, 1993 [JP] Japan .................................. 5-248833
Nov. 8, 1993 [JP] Japan .................................. 5-303466

[51] Int. Cl.⁶ .......................... G01G 19/40; G01G 13/00
[52] U.S. Cl. .......................................... 177/17; 177/25.18
[58] Field of Search ................................ 177/17, 25.18, 177/61, 116, 121

[56] References Cited

U.S. PATENT DOCUMENTS

| | | | |
|---|---|---|---|
| 4,508,186 | 4/1985 | Sashiki et al. | 177/25.18 X |
| 4,553,616 | 11/1985 | Haze | 177/25.18 X |
| 4,566,070 | 1/1986 | Tanaka | 177/25.18 X |
| 4,642,788 | 2/1987 | Haze | 177/25.18 X |
| 4,664,200 | 5/1987 | Mikami et al. | 177/25.18 |
| 4,676,325 | 6/1987 | Yamano et al. | 177/25.18 |
| 4,813,503 | 3/1989 | Douglas et al. | 177/25.18 |
| 4,880,142 | 11/1989 | Higuchi et al. | 177/116 X |
| 5,270,495 | 12/1993 | Mosher et al. | 177/25.18 |

FOREIGN PATENT DOCUMENTS

| | | |
|---|---|---|
| 0298736 | 1/1989 | European Pat. Off. . |
| 0319225 | 6/1989 | European Pat. Off. . |
| 57-56721 | 4/1982 | Japan . |
| 57-160021 | 10/1982 | Japan . |
| 63-30724 | 2/1988 | Japan . |
| 63-30725 | 2/1988 | Japan . |

OTHER PUBLICATIONS

European Search Report dated Nov. 30, 1994, Appl. No. 94306609.2.

Primary Examiner—Randy W. Gibson
Attorney, Agent, or Firm—Loeb & Loeb LLP

[57] ABSTRACT

In a combinational weighing apparatus or a combinational counting apparatus, in order to obtain a combinational weighing result generally equal to or close to the target combined value, different values are employed for target supply values $T_i$ to which articles are to be supplied into respective weighing hoppers $6_i$.

17 Claims, 14 Drawing Sheets

Fig. 5(a)

| Target Supply Weight Storage /24 | | | | |
|---|---|---|---|---|
| Target Supply Weight (Unit:g) | | | | |
| $T_1$ | $T_2$ | | $T_{n-1}$ | $T_n$ |
| 15.5 | 16.5 | | 23.5 | 24.5 |

Fig. 5(b)

Measured Weight Storage $21_1 \sim 21_n$

| | $7_1$ | $7_2$ | | $7_i$ | | $7_n$ |
|---|---|---|---|---|---|---|
| One cycle before | $W_{11}$ | $W_{21}$ | | $W_{i1}$ | | $W_{n1}$ |
| Two cycles before | $W_{12}$ | $W_{22}$ | | $W_{i2}$ | | $W_{n2}$ |
| ⋮ | ⋮ | ⋮ | | ⋮ | | ⋮ |
| N cycles before | $W_{1N}$ | $W_{2N}$ | | $W_{iN}$ | | $W_{nN}$ |

Fig. 5(c)

| Average | $W_{1a}$ | $W_{2a}$ | | $W_{ia}$ | | $W_{na}$ |
|---|---|---|---|---|---|---|
| Average Measured Weight Calculating | | | | | | |

$22_1 \sim 22_n$

Fig. 13(a)

| | $7_1$ | $7_2$ | | $7_i$ | | $7_n$ |
|---|---|---|---|---|---|---|
| | | | Measured Weight Storage | | | |
| One cycle before | $W_{11}$ | $W_{21}$ | | $W_{i1}$ | | $W_{n1}$ |
| Two cycles before | $W_{12}$ | $W_{22}$ | | $W_{i2}$ | | $W_{n2}$ |
| | | | | | | |
| N cycles before | $W_{1N}$ | $W_{2N}$ | | $W_{iN}$ | | $W_{nN}$ |

$21_1 \sim 21_n$

Fig. 13(b)

| Average | $W_{1a}$ | $W_{2a}$ | | $W_{ia}$ | | $W_{na}$ |
|---|---|---|---|---|---|---|
| | | | Average Measured Weight Calculating | | | |

$22_1 \sim 22_n$

Weighing Hopper Number 5,854,446

COMBINATIONAL WEIGHING OR COUNTING METHOD AND APPARATUS THEREFOR WITH HIGHLY ACCURATE COMBINATION RESULT

This is a continuation of application Ser. No. 08/330,347 filed on Sep. 2, 1994, now abandoned.

BACKGROUND OF THE INVENTION

1. Field of the Invention

The present invention relates to a combinational weighing or counting method and an apparatus therefor which utilize a plurality of weighing devices for weighing or counting a plurality of articles of varying value such as, for example, snacks, candies, fruits, vegetables or precise machine parts, and then to select an appropriate combination of the articles based on results of weight measurements or counts.

2. Description of the Prior Art

A combinational weighing apparatus is well known and is disclosed in, for example, the Japanese Laid-open Patent Publication No. 63-30725 published in 1988. The combinational weighing apparatus is a machine utilizing a plurality of weighing hoppers operatively coupled with a packaging machine so that bags each containing a plurality of articles, such as, for example, snacks, candies, fruits or vegetables, of varying value, can be averaged or substantially matched in value to a target combined value by selecting a combination of weighing hoppers accommodating the respective articles, the total value of which would meet with the target combined value for the bag.

Referring to FIG. 14, articles M to be weighed which have been transported by means of a delivery conveyor 1 are dispensed through a dispensing feeder 2 into a plurality of driving or article-conducting feeders $3_1$ to $3_n$ which subsequently loads fractions of the articles into respective weighing hoppers $6_1$ to $6_n$. A combination control means (not shown) selects some of the weighing hoppers $6_1$ to $6_n$. to thereby select an appropriate combination of the weighing hoppers $6_1$ to $6_n$. In other words, based on the values given by the respective weighing hoppers $6_1$ to $6_n$, the combination control means selects the appropriate combination of the weighing hoppers $6_1$ to $6_n$ which would eventually provides a bag of the articles having a total value equal or generally equal to a target combined value. The respective fractions of the articles M accommodated within the weighing hoppers $6_1$ to $6_n$ of the selected combination are discharged into a collecting chute 9 for loading to a bag or any other receptacle.

In order for the target combined value to be met by the total value of the selected combination of the articles, that is, the total value of the articles accommodated in the selected weighing hoppers $6_1$ to $6_n$, as accurately as possible, and also in order to accomplish an efficient selection of the appropriate combination, arrangement has hitherto been made that the amount of the articles M to be supplied into each of the weighing hoppers $6_1$ to $6_n$ is equal or approximate to a predetermined supply value T (for example, the quotient of the target combined value $T_M$ divided by the number m of the weighing hoppers selected for the optimum combination) to which the articles are supplied into the respective weighing hoppers $6_1$ to $6_n$. For this purpose, parameters for controlling a supply ability of each of the driving feeders $3_1$ to $3_n$ (such as representative of the amplitude of vibration to which each driving feeder is vibrated and the vibrating time over which such driving feeder is vibrated) are controlled in the following manner.

A parameter setting means (not shown) determines, for each of the driving feeders $3_1$ to $3_n$, parameters for the current weighing cycle on the basis of the parameters for the previous weighing cycle and the amounts of the articles actually supplied into the weighing hoppers $6_1$ to $6_n$ during the previous weighing cycle. The driving feeders $3_1$ to $3_n$ are vibrated according to the parameter so determined for the current weighing cycle that the amounts of the articles M corresponding to the predetermined supply value T can be supplied into the respective weighing hoppers $6_1$ to $6_n$.

In practice, however, it is often experienced that the value of the articles actually supplied into each weighing hopper $6_1$ to $6_n$, that is, the measured value of the articles within each weighing hopper $6_1$ to $6_n$, does unavoidably take a value somewhat differing from the predetermined supply value T. Because of this, the measured value $W_1$ to $W_n$ of the articles M accommodated in each of the weighing hoppers $6_1$ to $6_n$ may often become short of the predetermined supply value T to which the articles should be supplied into the respective weighing hopper $6_1$ to $6_n$ as shown in FIG. 15. In such case, the combined value $W_M$ corresponding to a combination of measured values $W_i$ of m articles expected for the value measurement becomes slightly smaller than the target combined value $T_M$. On the other hand, the combined value $W_M$ obtained by summing a combination of the measured values Wi given by the selected combination of m+1 weighing hoppers exceeds considerably over the target combined value $T_M$.

In view of the foregoing, in the combinational weighing apparatus of the type discussed above, a highly accurate result of the combinational weighing appears to be obtained if the measured values $W_1$ to $W_n$ each representative of the value of the articles accommodated within the respective weighing hopper $6_1$ to $6_n$ differ somewhat from each other. Accordingly, the applicant of the present invention has previously suggested a method in which different parameters are employed for the weighing hoppers so that the different measured values $W_1$ to $W_n$ can be obtained from the respective weighing hoppers $6_1$ to $6_n$, (See the Japanese Laid-open Patent Publication No. 57-56721, published in 1982, and the Japanese Laid-open Patent Publication No. 57-160021, published in 1982.)

According to the prior art combinational weighing apparatus such as disclosed in those Japanese publications, since the predetermined supply values allocated respectively to the weighing hoppers $6_1$ to $6_n$ are identical to each other, the use of the different parameters for those weighing hoppers $6_1$ to $6_n$ may not often result in sufficiently varying measured values Wi of the articles actually supplied into the weighing hoppers. Once this occurs, no highly accurate weighing result which is characteristic of the combinational weighing facility can be obtained. This problem equally occurs in a combinational counting apparatus.

SUMMARY OF THE INVENTION

The present invention has been devised with due regards paid to the foregoing problems and is intended to provide an improved combinational weighing apparatus capable of outputting a highly accurate combinational weighing result by differentiating the values of the articles actually supplied into the weighing hoppers.

The principle of the present invention herein disclosed and claimed will first be described.

Referring first to FIG. 1(a), when arrangement is made to differentiate target supply values $T_1$ to $T_n$ to which respective piles of articles are supplied into the weighing hoppers, calculated combinational values $W_M$ in which one or more of measured values $W_1$ to $W_n$ are combined and which have respective values different from each other can be generated as many as possible to thereby provide a relatively large freedom of choice.

For this purpose, according to one aspect of the present invention, the use is made of some or all of the target supply values for the respective weighing hoppers which are different from each other. Accordingly, actual amounts of supply of the articles to the respective weighing hoppers can take different values and combinational calculation of those actual amounts which are combined results in various values. Consequently, results of the combinational calculation approximating to the target combined value can be obtained.

As hereinbefore described, if the values of the articles supplied into the respective weighing hoppers are more or less different from each other, selection of the combinations close to the target combined value can be facilitated. Thus, differentiation of the measured values of the articles within the respective weighing hoppers gives rise to different values of the combined values.

Also, according to a preferred embodiment of the present invention, all of the target supply values $T_1$ to $T_n$ are different from each other. More specifically, the target supply values $T_1$ to $T_n$ for the respective weighing hoppers are so chosen as to satisfy the following equation (1) wherein the target supply value to which the articles are to be supplied into an arbitrarily chosen one of the weighing hoppers is expressed by $T_i$ and a target supply value greater than, but close to the target supply value $T_i$ is expressed by $T_{i+1}$, and a target supply value smaller than, but close to the target supply value $T_i$ is expressed by $T_{i-1}$:

$$T_{i+1} - T_i = T_i - T_{i-1} \qquad (1)$$

If the target supply values $T_1$ to $T_n$ do not only differ merely from each other, but differ from each other to some extent, the various combinational calculated weight $W_M$ can be obtained and, therefore, it is preferred that the target supply values $T_1$ to $T_n$ differ from each other to some extent. However, if the difference between the target supply values $T_1$ to $T_n$ is excessively large, the actual amount of supply of the articles into some of the weighing hoppers which have a relatively small target supply value will become zero, that is, the empty weighing hoppers will occur, resulting in undesirable reduction in number of the weighing hoppers that can be selected for the combination.

In view of the above, according to a further preferred embodiment of the present invention, the combinational weighing or counting apparatus comprises, in addition to the target supply value calculating means for setting some or all of the target supply values for the corresponding weighing hoppers to be of respective values different from each other, a target supply value control means for controlling the target supply value calculating means on the basis of the measured weights of the articles in the weighing hoppers so as to minimize the probability that the weight of the articles subsequently supplied into the respective weighing hopper may become zero. According to this embodiment, since the weight of the articles supplied during the next succeeding weighing or counting cycle will seldom become zero and, therefore, the empty weighing hoppers will hardly occur.

According to a different preferred embodiment of the present invention, the combinational weighing or counting apparatus is provided with a target supply value storage means for storing the target supply value for each weighing hopper, and a target supply value calculating means for calculating the target supply value for each weighing hopper on the basis of the target combined value or the average value of the target supply values for all weighing hoppers and for outputting the calculated target supply value to the target supply value storage means for storage thereof in such target supply value storage means.

According to this different embodiment of the present invention, the target supply value calculating means calculates the target supply value for each weighing hopper oil the basis of the target combined value or the average value of the target supply values and, therefore, an operator of the apparatus need not calculate and input the target supply value for each weighing hopper. Therefore, the apparatus is easy to operate and there is no possibility of an error occurring during the inputting.

In the meantime, the measured weights associated with the respective weighing hoppers, that is, the actual weights of the articles supplied into the respective weighing hoppers, may deviate relative to the target supply values. If this deviation is small, it may occur that the measured weights will coordinate at a small value. To avoid this possibility, it is necessary to render the difference between the target supply values for the corresponding weighing hoppers to be great. On the other hand, if when the deviation referred to above is greater than a predetermined value the difference between the target supply values for the corresponding weighing hoppers is made large, some of the weighing hoppers will be supplied with the articles in an excessively great or smaller quantity (in terms of the measured weight) and such weighing hoppers will no longer be utilized for selection of the combination and, in such case, the number of combinations will decrease substantially. Accordingly, where the deviation referred to above is greater than the predetermined value, it is necessary to decrease the difference between the target supply values for the corresponding weighing hoppers.

According to a yet further preferred embodiment of the present invention, the combinational weighing or counting apparatus is provided with, in addition to the target supply value storage means, a target supply value calculating means for calculating the target supply value for each weighing hopper and for storing the calculated target supply value in the target supply value storage means; a deviation calculating means for calculating a degree of deviation in measured weight of each weighing hopper on the basis of the measured weights of the articles which have previously been supplied into the weighing hoppers during previous weighing cycles; and a target supply value control means for controlling the target value calculating means on the basis of the degree of deviation.

In the meantime, if the target supply values $T_i$ to $T_n$ are sequentially arranged in a circumferential direction as shown in FIG. 1($b$), a deviation may occur in the target supply value to such an extent that, statistically, no measured weight closer to the target supply value can be obtained.

In view of the above, the combinational weighing or counting apparatus according to a still further preferred embodiment of the present invention has the weighing hoppers divided into a first group of the weighing hoppers having a relatively great target supply value and a second group of weighing hoppers having a relatively small target supply values, said first and second groups of the weighing hoppers being disposed around a periphery of a circular dispensing feeder, and is provided with a delivery conveyor supplying by gravity the articles to the dispensing feeder so that the articles are supplied into the first group of the weighing hoppers in a quantity greater than those supplied into the second group of the weighing hoppers. According to this embodiment, it is easy to obtain the measured weight corresponding to the target supply value and, therefore, the result of combination which is closer to the target supply value can be obtained.

In the meantime, as shown in FIG. 10(c), while the measured weights $W_i$ take respective values deviated relative to the target supply value $T_i$, if the deviation of the measured weights $W_i$ is smaller than a predetermined value, the calculated weights in which an arbitrarily chosen number m of the measured weights $W_1$ to $W_n$ are combined and the combinational calculated weight in which a number (m+1) of the measured weights $W_1$ to $W_n$ are combined may take scattering values, respectively, and therefore, it is necessary to render the measured weight to have a deviation.

In view of the foregoing, according to a yet still further preferred embodiment of the present invention, the combinational weighing or counting apparatus is provided with an average measured weight calculating means, a standard parameter setting means and a deviated parameter calculating means. The average measured weight calculating means is operable to calculate, for each of the weighing hoppers, an average value of the measured weights of the articles which have previously been supplied into the weighing hoppers during previous weighing cycles. The standard parameter setting means is operable to determine a standard parameter, which may be used as a reference for a new parameter, on the basis of excess or shortage of the amount of supply of the articles determined as a result of comparison between the average measured value and the target supply value. The deviated parameter calculating means is operable to calculate, for each of the weighing hoppers, a new parameter having a deviation in reference to the standard parameter.

According to this yet still further embodiment of the present invention referred to above, the driving feeders can be driven by calculating the new reference parameter based on the average measured weight calculated on the basis of the previously measured weights of the articles supplied into the respective weighing hoppers during the previous weighing cycles and the target supply value and by applying a deviation to the reference parameter. Therefore, the deviation can be given to the measured weight for each of the weighing hopper, giving rise to a result of combination which further approximates to the target supply value.

The principle of the combinational weighing or counting apparatus according to a different aspect of the present invention designed to accomplish the previously described object will now be described.

Referring to FIG. 1(c), even though the target supply values T for the respective weighing hoppers remain, for example, the same, and where a deviation of the measured weight $W_i$ of the articles actually supplied into an arbitrarily chosen i-th weighing hopper is greater than the curve shown in FIG. 1(d) with respect to the target supply value T for the i-th weighing hopper, the measured weights $W_1$ to $W_n$ shown in FIG. 1(c) will hardly take an equal value. Accordingly, if the measured weights $W_i$ having a deviation with the target supply value T taken as a statistically average value, the number of the combinational calculated weights $W_M$ different from each other increases and, accordingly, the accuracy of results of combination will increase.

In other words, although as shown in FIG. 1(c), the measured weights $W_i$ may take a varying value relative to the target supply value T, if the deviation of the measured weights $W_i$ is smaller than a predetermined value to a certain extent, a case may occur in which both of the combinational calculated weight in which an arbitrarily chosen number m of the measured weights $W_1$ to $W_n$ shown in FIG. 15 are combined and the combinational calculated weight in which a number (m+1) of the measured weights $W_1$ to $W_n$ are combined may take a scattering value, and therefore, it is necessary to impart a deviation to the measured weights $W_i$.

Therefore, the present invention according to the different aspect provides the combinational weighing or counting apparatus which is provided with an average measured value calculating means, a standard parameter setting means, a deviation determining means and a deviated parameter calculating means. The average measured value calculating means is operable to calculate, for each of the weighing hoppers, an average value of the measured weights of the articles which have previously been supplied into the weighing hoppers during previous weighing cycles. The standard parameter setting means is operable to determine a standard parameter, which may be used as a reference for a new parameter, on the basis of excess or shortage of the amount of supply of the articles determined as a result of comparison between the average measured value and the target supply value. The deviation determining means operates to determine, on the basis of the measured weights of the articles which have previously been supplied into the weighing hoppers during previous weighing cycles, excess or shortage of a degree of deviation of each of the measured weight. Finally, the deviated parameter calculating means calculates, for each of the weighing hoppers, a new parameter on the basis of the standard parameter and the excess or shortage of the degree of deviation.

The respective target supply values T for the weighing hoppers may be equal to each other.

With the combinational weighing or counting apparatus according to this different aspect of the present invention, determination of excess or shortage of the degree of deviation of the measured weights is carried out on the basis of the weights of the articles supplied into the weighing hoppers which have previously measured during the preceding weighing cycles, so that a new parameter necessary to control the deviation of the parameters which will be employed during the forthcoming weighing cycles can be calculated. Accordingly, during the forthcoming weighing cycles, a deviation can be imparted to the measured weights.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIGS. 5(a), 5(b) and 5(c) are diagrams showing contents stored in a target supply value storage means, contents stored in a measured weight storage means and the relationship between the measured weight $W_{ij}$ and the average measured weight $W_{ia}$, respectively, according to the first embodiment of the present invention;

FIGS. 13(a) and 13(b) pertain to the fifth preferred embodiment of the present invention and illustrate respective diagrams showing contents stored in a measured weight storage means and the relationship between the measured weight $W_{ij}$ and the average measured weight $W_{ia}$, respectively, according to the fifth preferred embodiment of the present invention;

DETAILED DESCRIPTION OF THE EMBODIMENTS

Hereinafter, some embodiments of the present invention will be described with reference to the accompanying drawings.

Figure 1A:
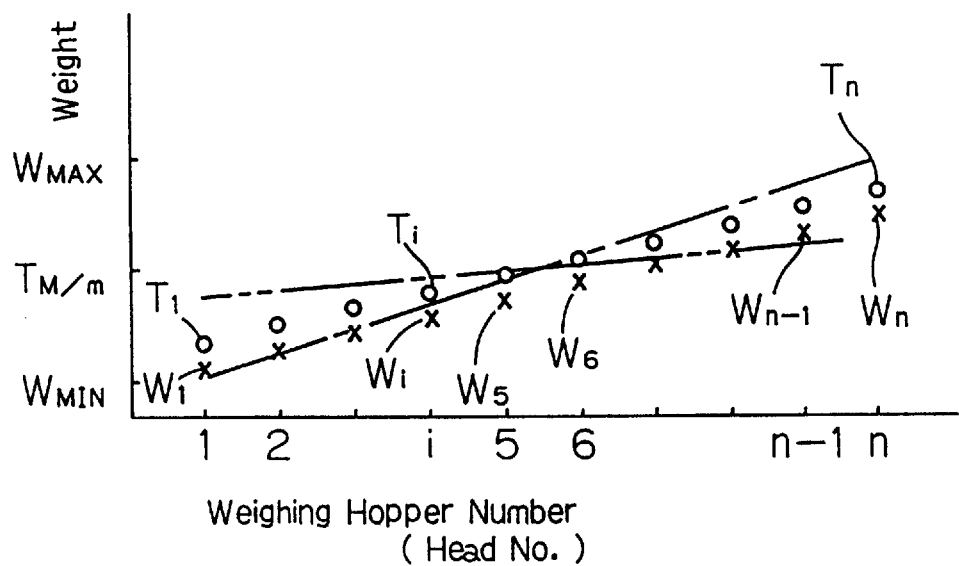
FIGS. 1(a) and 1(b) altogether illustrate a schematic diagram showing the relationship between the target supply value and the measured weight (the weight of articles supplied into each weighing hopper) in a combinational weighing apparatus according to one aspect of the present invention.
Figure 1B:
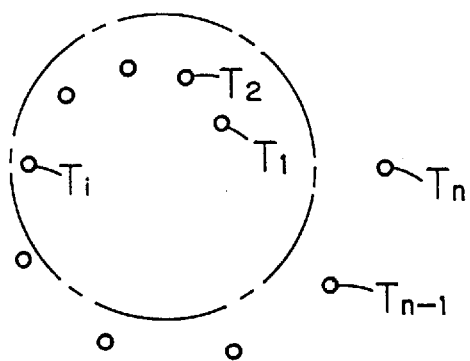
Figure 1C:
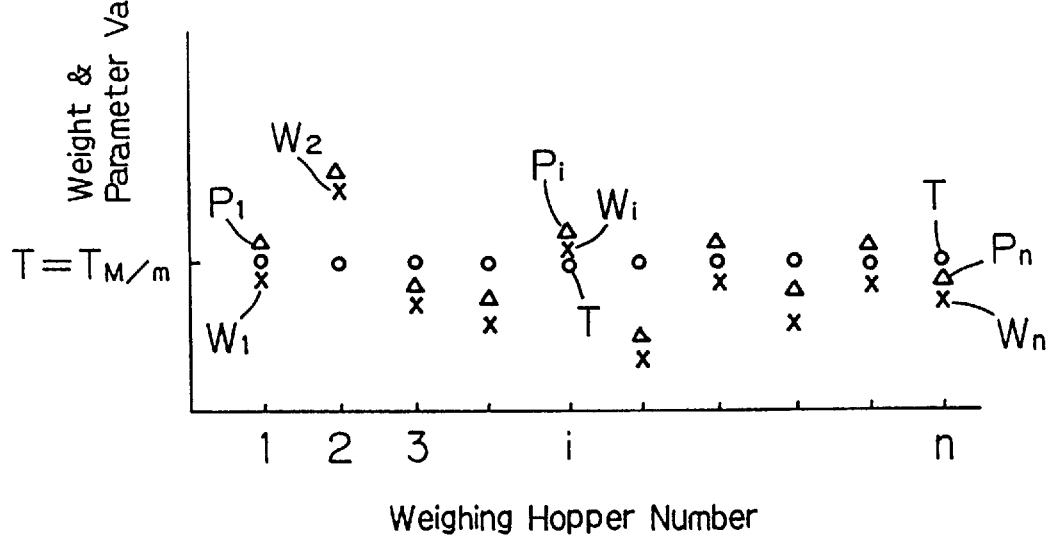
FIGS. 1(c) and 1(d) altogether illustrate a schematic diagram showing the relationship between the target supply value and the measured weight (the weight of articles supplied into each weighing hopper) in a combinational weighing apparatus according to a different aspect of the present invention.
Figure 1D:
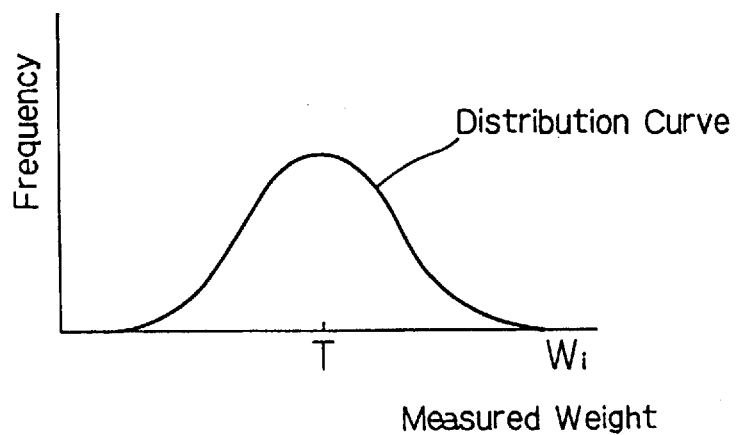
Figure 2:
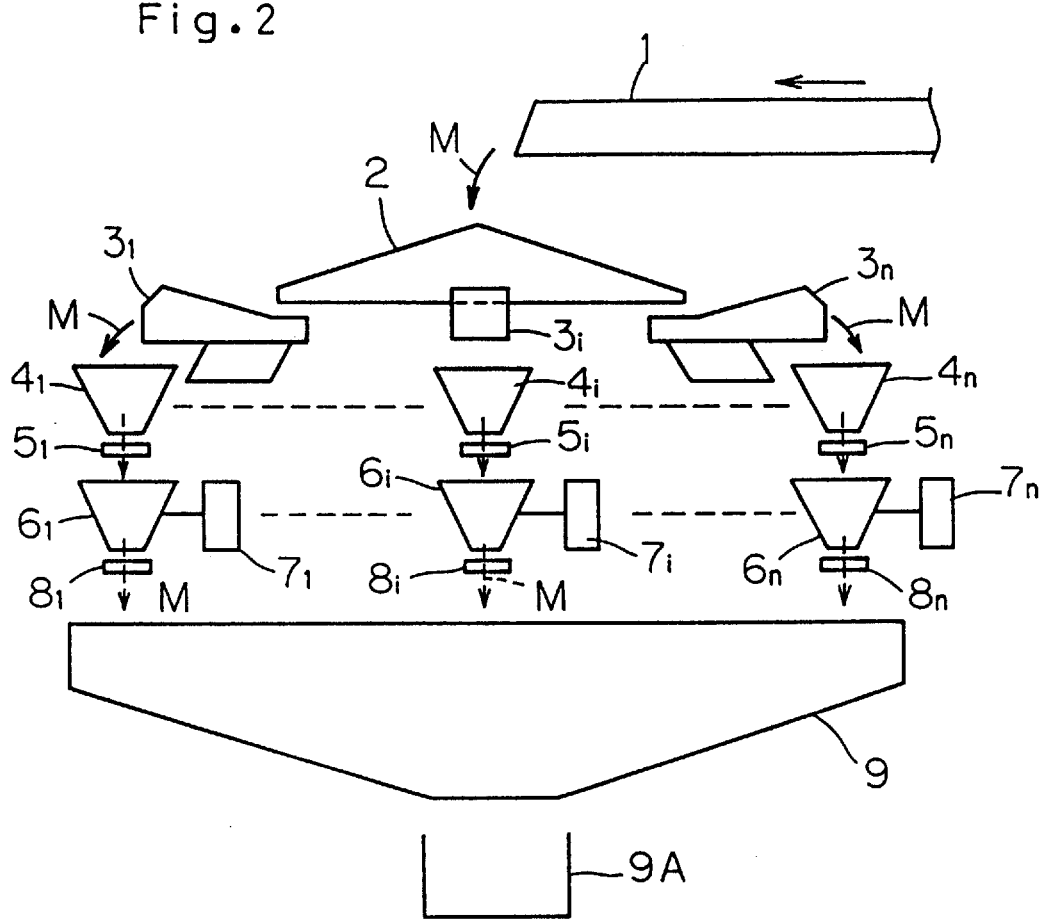
FIG. 2 is a schematic diagram showing a concept of the mechanical structure of the combinational weighing apparatus.

FIGS. 1 to 5 illustrates a first preferred embodiment of the present invention. Referring first to FIG. 2, a delivery conveyor 1 is operable to fall articles M to be weighed onto a central portion of a generally flat conical distributing feeder 2. A number n of driving or article-conducting feeders $3_1$ to $3_n$ are disposed around and substantially beneath an outer peripheral edge of the distributing feeder 2. Each of these driving feeders $3_1$ to $3_n$ is, while driven according to predetermined parameters, that is, while vibrated at a predetermined amplitude for a predetermined length of time, operable to feed the articles M to be weighed on the distributing feeder 2 onto an equal number n of pooling hoppers $4_1$ to $4_n$ each provided with a respective gate $5_1$ to $5_n$. Weighing hoppers $6_1$ to $6_n$ are disposed immediately beneath the associated pooling hoppers $4_1$ to $4_n$. Each of the weighing hoppers $6_1$ to $6_n$ is provided with a respective hopper weight measuring device $7_1$ to $7_n$ and a respective gate $8_1$ to $8_n$. Positioned beneath the gates $8_1$ to $8_n$ are a relatively large-sized discharge chute 9.

Figure 3:
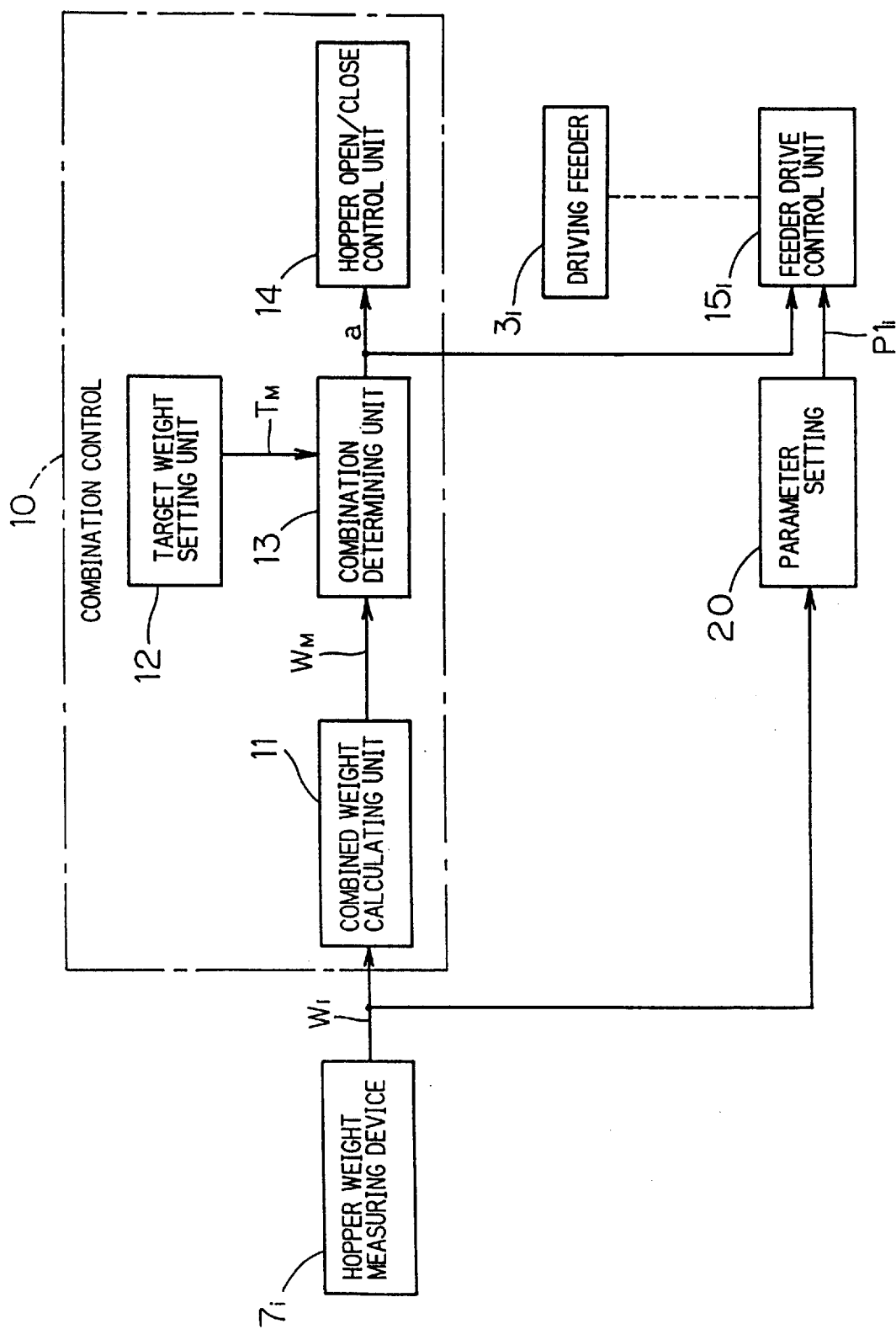
FIG. 3 is a block circuit diagram showing the combinational weighing apparatus according to the first preferred embodiment of the present invention.

Referring to FIG. 3, each of the hopper weight measuring devices $7_i$ comprises, for example, a load cell and is operable to measure the weight of the article M within the corresponding weighing hopper $6_i$ (FIG. 2) and also to output the measured weight $W_i$ to a combination control means 10 and a parameter setting means 20. It is to be noted that, in the drawings, a suffix "i" affixed to some of the reference numerals is intended to means that the element or signal designated by the relevant reference numeral to which the suffix is affixed is employed in a plural number n. It is also to be noted that both of the combination control means 10 and the parameter setting means 20 are comprised of a microcomputer (CPU).

The combination control means 10 is operable to select an appropriate combination of the weighing hoppers $6_i$ by combining some of the weights of the articles M measured respectively by the weighing hoppers $6_1$ to $6_n$ shown in FIG. 2. The combination control means 10 shown in FIG. 10 comprises a combined weight calculating unit 11, a target weight setting unit 12, a combination determining unit 13 and a hopper open/close control unit 14. The combined weight calculating unit 11 performs a summation of a combination of arbitrarily chosen in measured weights $W_i$ out from the measured weights $W_1$ to $W_n$ measured respectively by the hopper weight measuring devices $7_1$ to $7_n$ and then outputs the sumumed weight $W_M$, that is, the total weight of the number m of the measured weights $W_i$ to the combination determining unit 13. This summation and the outputting of the summed weight $W_M$ are carried out subject to all combinations. The combination determining unit 13 compares the summed weight $W_M$ from the combined weight calculating unit 11 with a target combined value $T_M$ fed from the target weight setting unit 12 to select the weight of the articles M which is equal to the target combined value $T_M$ or within an allowance between a lower limit value (normally, equal to the target combined value $T_M$) and an upper limit value, and then outputs a selection signal a to the hopper open/close control unit 14 and a feeder control unit $15_i$.

The hopper open/close control unit 14 opens the gates $8_i$ of a selected number m of the weighing hoppers $6_i$. In this way, the articles M are discharged from the selected weighing hoppers $6_i$, subsequently collected together in the collecting and discharge chute 9 and finally supplied onto a packaging machine 9A. Also, the hopper open/close control units 14 (FIG. 13) opens the gates $5_i$ of some of the pool hoppers $4_i$ which are associated with the emptied weighing hoppers $6_i$, thereby allowing the articles M to be supplied from such pool hopper $4_i$ onto such weighing hoppers $6_i$. On the other hand, the feeder drive control unit $15_i$ is employed for each of the drive feeders $3_i$ and is operable to drive the drive feeders $3_i$ associated with the emptied pooling hoppers $4_i$ shown in FIG. 2 according to the predetermined parameter to deliver the articles M to the pool hoppers 41.

Figure 4:
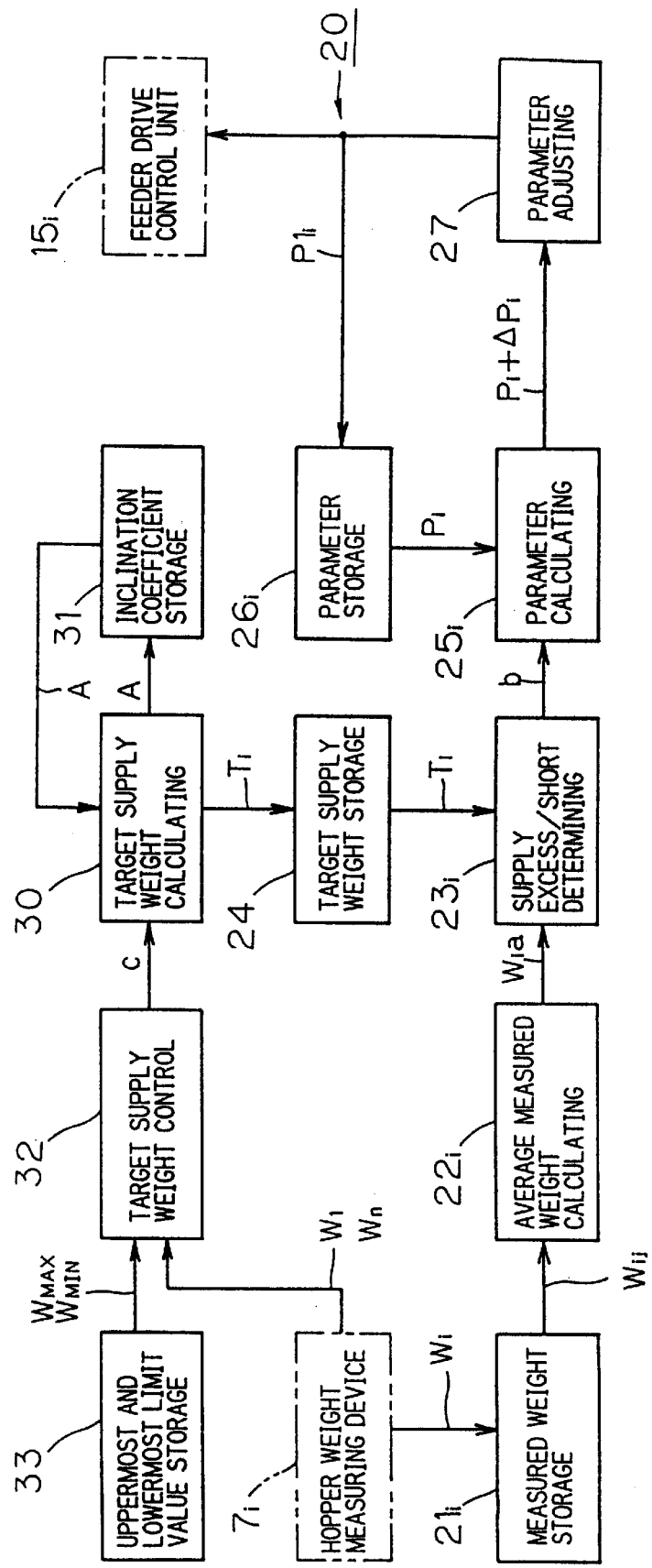
FIG. 4 is a block circuit diagram showing a parameter setting means employed in the combinational weighing apparatus shown in FIG. 3.

As shown in FIG. 4, the parameter setting means 20 comprises various means shown by the sold lines. Each measured weight storage means $21_i$ receives the measured weight $W_i$ from the associated hopper weight measuring device $7_i$ and stores a number of the measured weights $W_{i1}$ to $W_{iN}$ which have previously been measured during a number N of measuring cycles. In other words, Each measured weight storage means $21_i$ stores, as shown in FIG. 5(b), the measured weights $W_{i1}$ to $W_{iN}$ measured by the associated hopper weight measuring device $7_i$ during the first to N-th measuring cycles.

The measured weights $W_{i1}$ to $W_{iN}$ stored in each measured weight storage means $21_i$ are supplied to an average measured weight calculating means $22_i$ by which, according to the following equation (2) and as shown in FIG. 5(c), an average value $W_{ia}$ of the weights measured by the i-th hopper weight measuring device $7_i$.

$$W_{ia}=(W_{i1}+W_{i2}+\ldots+W_{ij}+\ldots+W_{iN})/N \qquad (2)$$

wherein $W_{ij}$ represents the measured weight measured by the i-th hopper weight measuring device $7_i$ during the measuring cycle preceding j times and N represents a natural integer selected within the range of, for example, 1 to 20.

Figure 9:
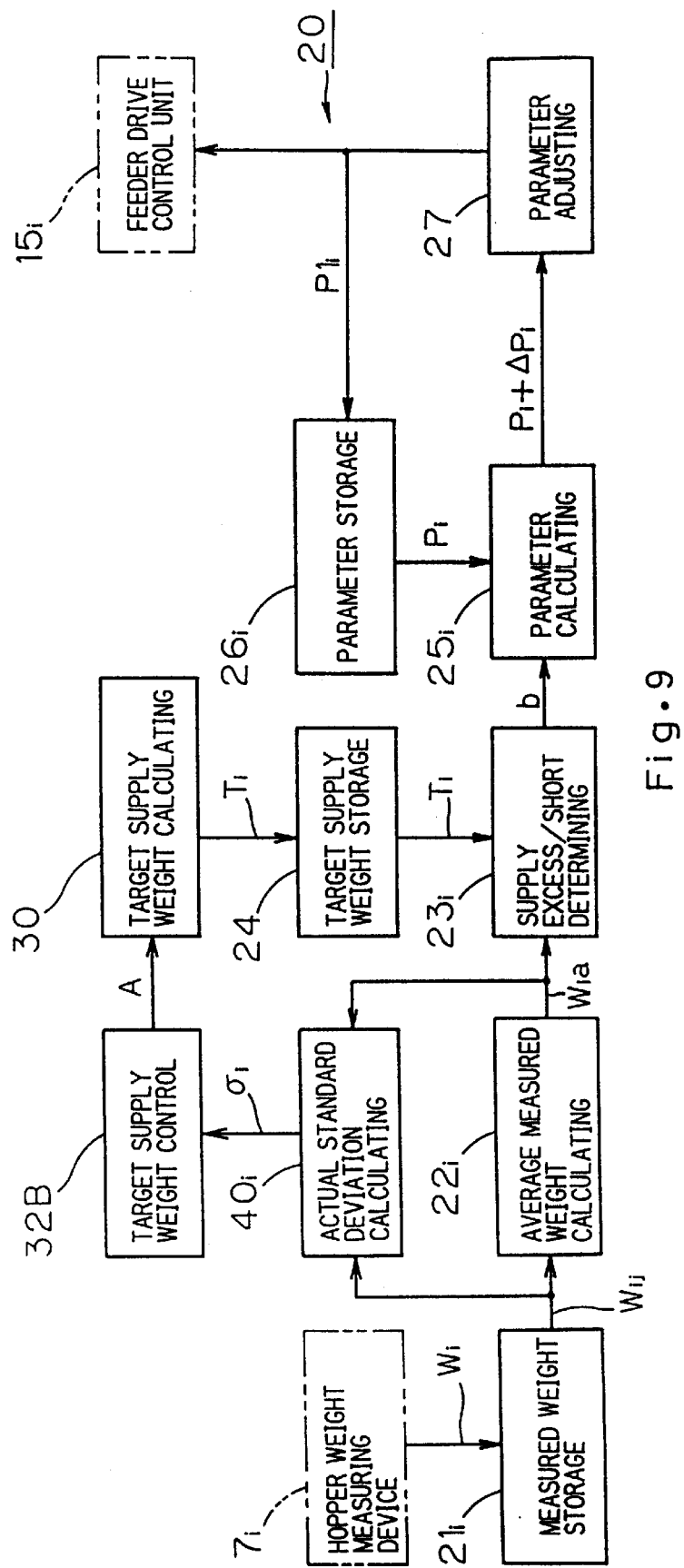
FIG. 9 is a block circuit diagram showing the parameter setting means employed in the combinational weighing apparatus according to a third preferred embodiment of the present invention.

The average measured weight calculating means $22_i$ outputs the average measured weight $W_{ia}$ to a supply excess/short determining means $23_i$ shown in FIG. 9. This supply short/excess determining means $23_i$ compares the average measured weight $W_{ia}$ with a target supply value $T_i$ for each weighing hopper $6_i$ (FIG. 2) which is stored in a target supply value storage means 24 and then outputs an excess/short signal b to a parameter calculating means $25_i$. The target supply value $T_i$ will be described in detail later.

Based on the parameter $P_i$ for the previous weighing cycle fed from the parameter storage means $26_i$ and the excess/short signal b fed from the supply excess/short determining means $23_i$, each parameter calculating means $25_i$ calculates a new parameter $P_i+\Delta P_i$. By way of example, the parameter calculating means $25_i$ calculates the new parameter $P_i+\Delta P_i$ by subtracting a single unit from the parameter $P_i$ for the previous weighing cycle in the event that the average measured weight $W_{ia}$ is greater than the target supply value $T_i$ (in this case, $\Delta P_i$ takes a negative value), but calculates the new parameter $P_i+\Delta P_i$ by adding a single unit to the parameter $P_i$ for the previous weighing cycle in the event that the average measured weight $W_{ia}$ is smaller than the target supply value $T_i$ (in this case, $\Delta P_i$ takes a positive value).

The new parameter $P_i+\Delta P_i$ is outputted from the parameter calculating means $25_i$ to a parameter adjusting means 27. This parameter adjusting means 27 determines whether or not the new parameter $P_i+\Delta P_i$ is proper in the light of the balance between the weighing hopper $6_1$ to $6_n$ and, in the event that the parameter $P_i+\Delta P_i$ is found not proper, modifies it to provide a parameter $P1_i$ for the next succeeding weighing cycle. By way of example, the parameter adjusting means 27 referred to above stores a predetermined balance control value $\alpha$ and is, therefore, operable to adjust the parameter $P1_i$ for the next succeeding weighing cycle to a value greater than the lowermost limit value (Pa−$\alpha$) and smaller than the uppermost limit value (Pa+$\alpha$). It is to be noted that Pa referred to above represents a calculated average value (a simple average value) of the new parameters $(P_1+\Delta P_1)$ to $(P_n+\Delta P_n)$.

The parameter $P1_i$ for the next succeeding weighing cycle is outputted to both of a feeder drive control device $15_i$ and the parameter storage means $26_i$. Each feeder drive control unit $15_i$ is operable to control the length of time during which the associated driving feeder $3_i$ (FIG. 2) is to be vibrated, which time is hereinafter referred to as the vibrating time, and the amplitude of vibration according to the parameter $P1_i$ for the next succeeding weighing cycle. On the other hand, the parameter storage means $26_i$ stores the parameter $P1_i$ for the next succeeding weighing cycle as the parameter $P_i$ for the previous weighing cycle so that the latter can be used for the determination of the parameter $P1_i$ for a further next succeeding weighing cycle.

An essential portion of the present invention will now be described in detail. As clearly shown in FIG. 5(a), the target supply value storage means 24 stores target supply values $T_1$ to $T_n$ for the associated weighing hoppers $6_1$ to $6_n$ shown in FIG. 2.

All of the target supply values $T_i$ to $T_n$ stored in the previously discussed target supply value storage means 24 are set to respective values different from each other as shown in FIG. 5(a). Each of these target supply values $T_i$ is calculated by a target supply value calculating means 30 according to the following equation (3), and the target supply value calculating means 30 supplies the respective target supply value $T_i$, so calculated thereby, to the target supply value storage means 24 to update the contents stored in such target supply value storage means 24.

$$T_i=(T_M/m)+A\cdot[i-\{(n+1)/2\}] \qquad (3)$$

wherein A represents a coefficient of inclination, $T_M$ represents a target combined value, i represents the number allocated to each weighing hopper (i=1, 2, 3, ... n), mn represents an ideal number of the weighing hoppers to be selected (in the case of n=10, 4 or 5 is generally chosen, but it is not always limited to a natural integer), and n represents the total number of the hoppers.

In other words, each target supply value $T_i$ is defined as a linear function of i as shown in, for example, FIG. 1(a). It is to be noted that, in the foregoing equation (3), the target combined value $T_M$, the number m and the total number n of the hoppers are determined beforehand.

The target supply values $T_i$ to $T_n$ calculated according to the foregoing equation (3) take respective values $T_i$ to $T_n$ different from each other, and the target supply value $T_{i+1}$ and $T_{i-1}$ which are greater and smaller, respectively, than the target supply value $T_i$ for the arbitrarily chosen weighing hopper $6_i$ and closest to the target supply value $T_i$ satisfy the following equation (1).

$$T_{i+1}-T_i=T_i-T_{i-1} \qquad (1)$$

In this equation (1), the difference among the target supply values for the weighing hoppers $6_i$ is constant and, accordingly, all of the target supply values $T_1$ to $T_n$ vary linearly. In the practice of the present invention, however, the difference referred to above may not be always constant and the target supply values $T_1$ to $T_n$ may accordingly vary so as to depict a curve.

As shown in FIG. 4, the coefficient of inclination A is a parameter to be updated by the target supply value calculating means 30 each time the combination weighing is to be performed, and is updated and stored in an inclination coefficient storage means 31 for each weighing cycle. The target supply value calculating means 30 is controlled by a target supply value control means 32 in the manner which will now be described.

The target supply value control means 32 is inputted with both of the measured weight $W_1$, given by one of the hopper weight measuring devices $7_1$ to $7_n$ that is associated with the weighing hopper $6_1$ for which the target supply value is minimum, and the measured weight $W_n$ given by another one of the hopper weight measuring devices $7_1$ to $7_n$ that is associated with the weighing hopper $6_n$ for which the target supply value is maximum, and is also inputted with the lowermost limit value $W_{MIN}$ and the uppermost limit value $W_{MAX}$ from a uppermost and lowermost limit value storage means 33. The target supply value control means 32 shown in FIG. 4 compared the smallest measured weight $W_1$ with the lowermost limit value $W_{MIN}$ and outputs a control command c necessary to reduce the coefficient A of inclination to the target supply value calculating means 30 in the event that the measured weight $W_1$ is smaller then the lowermost limit value $W_{MIN}$. The target supply value control means 32 also compared the maximum measured weight $W_n$ with the uppermost limit value $W_{MAX}$ and outputs a control command c necessary to reduce the coefficient A of inclination to the target supply value calculating means 30 in the event that the measured weight $W_1$ is greater than the uppermost limit value $W_{MAX}$.

On the other hand, in the event that the minimum measured weight $W_1$ is greater than the lowermost limit value $W_{MIN}$ and the maximum measured weight Wn is smaller than the uppermost limit value $W_{MAX}$, a counter not shown starts counting. When the counting continues a predetermined number, that is, when the counts of the counter attain a predetermined value, the target supply value control means 32 outputs a control command c necessary to increase the coefficient A of inclination to the target supply value calculating means 30.

In this way, based on the measured weights $W_1$ and $W_n$ of the articles M dispensed into the weighing hoppers $6_1$ and $6_n$, the target supply value control means 32 minimizes the probability that the weight of the articles M to be dispensed into each weighing hopper $6_i$ becomes zero or excessive. It is, however, to be noted that, in the event that the average value of the target supply values $T_i$ is, for example, 20 grams, the lowermost limit value $W_{MIN}$ is set to about 10 grams and the uppermost limit value $W_{MAX}$ is set to about 30 grams.

The basic operation of the combinational weighing apparatus will be described hereinafter.

The articles M to be weighed are supplied from the delivery conveyor 1 shown in FIG. 2 to a position above the distributing feeder 2 and are, after having been passed through the driving feeder $3_i$, the pooling hopper $4_i$, the weighing hopper $6_i$ and the collecting and discharge chute 9, collected and packaged by the packaging machine 9A. At this time, the combination control means 10 shown in FIG. 3 selects a combination of an appropriate number m of the weighing hoppers $6_i$ (FIG. 2) as hereinbefore described. Subsequently, the combination control means 10 selects a combination of the remaining weighing hoppers $6_i$ and, similarly, a combinational discharge is carried out. On the other hand, the hopper open/close control unit 14 opens the gates $5_i$ of the pooling hoppers 41 associated with the weighing hoppers $6_i$ as shown in FIG. 2 from which the articles M have been discharged, to allow the articles M to be delivered from the pooling hoppers $4_i$ to the empty weighing hoppers $6_i$. Also, the driving feeders $3_i$ associated with the pooling hoppers $4_i$ from which the articles M have been discharged are driven to supply the articles M onto the empty pooling hopper $4_i$.

During the combinational weighing operation described above, the target supply value control means 32 shown in FIG. 4 compares the small measured weight $W_1$, measured by the hopper weight measuring device $7_1$, with the lowermost limit value $W_{MIN}$ and also compare the great measured weight $W_n$, measured by the hopper weight measuring device $7_n$, with the uppermost limit value $W_{MAX}$. In the event that the target supply value control means 32 determines that the small measured weight $W_1$ is greater than the lowermost limit value $W_{MIN}$ and the great measured weight $W_n$ is smaller than the uppermost limit value $W_{MAX}$, and also that this condition is repeated a predetermined number of times, the target supply value control means 32 outputs a control command c necessary to increase the coefficient A of inclination to the target supply value calculating means 30.

In response to this output from the target supply value control means 32, the target supply value calculating means 30 updates the previous coefficient A of inclination by one unit greater thereby calculating the target supply value $T_1$ for each hopper weight measuring device. Because of this, the target supply values $T_1$ to $T_n$ shown in FIG. 1 take respective values different from each other as shown by the single-dotted chain line and, therefore, the measured weights $W_1$ to $W_n$ may seldom take the same value. Accordingly, the calculated combination weight $W_M$ corresponding to a combination of one or more of the measured weights $W_1$ to $W_n$ takes one of various values. Consequently, the combination selected weight $W_S$ selected from the calculated combination weights $W_M$ is apt to take a value approximating to the target combined value $T_M$.

Specifically in the case of the illustrated embodiment, the target supply values $T_1$ to $T_n$ are so chosen to be respective values which satisfy the equations (1) and (3) discussed hereinbefore. Accordingly, since the target supply values $T_1$ to $T_n$ are available as distributed evenly within a predetermined range, the measured weights $W_1$ to $W_n$ can be more easily differentiated from each other. Therefore, the combination selected weight $W_S$ is apt to be of a value approximating to the target combined value $T_M$.

On the other hand, if the coefficient A of inclination is excessively increased, there may be a possibility that an empty weighing hopper $6_i$ and/or an excessively loaded weighing hopper $6_i$ which cannot be used for selection of the combination may be found. In view of this, in the illustrated embodiment, control is made to avoid an excessive increase of the coefficient A of inclination.

The target supply value control means 32 shown in FIG. 4 outputs the control command c necessary to reduce the coefficient A of inclination, in the event that the small measured weight $W_1$ measured by the hopper weight measuring device $7_1$ is smaller than the lowermost limit value $W_{MIN}$. Where the great measured weight $W_n$ measured by the hopper weight measuring device $7_n$ is greater than the uppermost limit value $W_{MAX}$, the target supply value control means 32 outputs the control command c necessary to reduce the coefficient A of inclination. In response to this control command c, the target supply value calculating means 30 calculates the target supply value $T_i$ by updating to a value smaller by one unit the previous coefficient A of inclination read from the inclination coefficient storage means 31 in the event that the small measured weight $W_1$ is smaller than the lowermost limit value $W_{MIN}$ or the great measured weight $W_n$ is greater than the uppermost limit value $W_{MAX}$. Accordingly, since the target supply values $T_1$ to $T_n$ vary as shown by the double-dotted line in FIG. 1, there is less possibility that the empty or excessively loaded weighing hoppers $6_i$ exists. As a result thereof, since there occur no weighing hopper $6_i$ that cannot be used for the selection of the combination, the efficiency of the combinational weighing operation increases.

Also, since the new target supply value $T_i$ is automatically updated and set from time to time, and even though the initial preset value for each of the target supply values $T_1$ to $T_n$ is not proper, each target supply value $T_1$ to $T_n$ comes to take a proper value as the weighing continues. Accordingly, the setting of appropriate target supply value $T_1$ to $T_n$ is easy and simple to perform.

Although in the embodiment shown in and described with reference to FIG. 4 the target supply values $T_i$ for the respective weighing hoppers $6_i$ have been controlled in dependence on both of the uppermost and lowermost limit values $W_{MAX}$ and $W_{MIN}$, the target supply values $T_i$ for the respective weighing hoppers $6_i$ may be controlled in dependence on only the lowermost limit values $W_{MIN}$. In other words, a possible embodiment wherein only control is carried out to minimize the possibility that the supply weight $W_i$ may become zero should be construed as included within the scope of the present invention.

Also, the target supply value control means 32 may be so designed and so structured as to control the target supply value calculating means 30 in the following manner. That is, in the event that the smallest measured weight $W_1$ or the greatest measured weight $W_n$ is out of the range of the uppermost limit value $W_{MAX}$ to the lowermost limit value $W_{MIN}$, the target supply value control means 32 stores the departure of the smallest or greatest measured weight $W_1$ or $W_n$ from the range and, in the event that, within a predetermined frequency of supply of the articles counted by a counter into the weighing hoppers, the smallest measured weight $W_1$ or the greatest measured weight $W_n$ again departs from the range of the uppermost limit value $W_{MAX}$ to the lowermost limit value $W_{MIN}$, the target supply value control means 32 resets the counter and outputs to the target supply value calculating means 30 a control command c necessary to decrease the coefficient A of inclination. On the other hand, if both the smallest measured weight $W_1$ and the greatest measured weight $W_n$ are within the range of the uppermost limit value $W_{MAX}$ to the lowermost limit value $W_{MIN}$, the target supply value control means 32 stores that the smallest measured weight $W_1$ and the greatest measured weight $W_n$ are within the range of the uppermost limit value $W_{MAX}$ to the lowermost limit value $W_{MIN}$ and, in the event that, within the predetermined frequency of supply of the articles into the weighing hoppers, the smallest measured weight $W_1$ and the greatest measured weight $W_n$ stay within the range of the uppermost limit value $W_{MAX}$ to the lowermost limit value $W_{MIN}$, the target supply value control means 32 outputs to the target supply value calculating means 30 a control command c necessary to increase the coefficient A of inclination and, at the same time, resets the counter.

It is to be noted that, when the weighing hoppers $6_1$ to $6_n$ having the respective target supply values $T_1$ to $T_n$ (FIG. 2) are arranged in a circular row in the order of 1 to n as shown in FIG. 1(b), it may occur statistically that no measured weight $W_i$ close to the target supply value $T_i$ will be obtained because the target supply values $T_i$ to $T_n$ have a deviation circumferentially. In such case, the target supply values $T_1$ to $T_n$ may be re-arranged in position such as shown in FIG. 6 or FIG. 7. Hereinafter, a modification of the present invention shown in any one of FIGS. 6 and 7 will be discussed. It is, however, to be noted that, in each of FIG. 1(b), FIG. 6(b) and FIG. 7(b), the relationship between the magnitude of the target supply value $T_i$ and the position of the weighing hopper $6_i$ shown in FIG. 2 is plotted in the polar coordinate system with the radius vector representing the magnitude of the target supply value $T_i$.

Figure 6A:
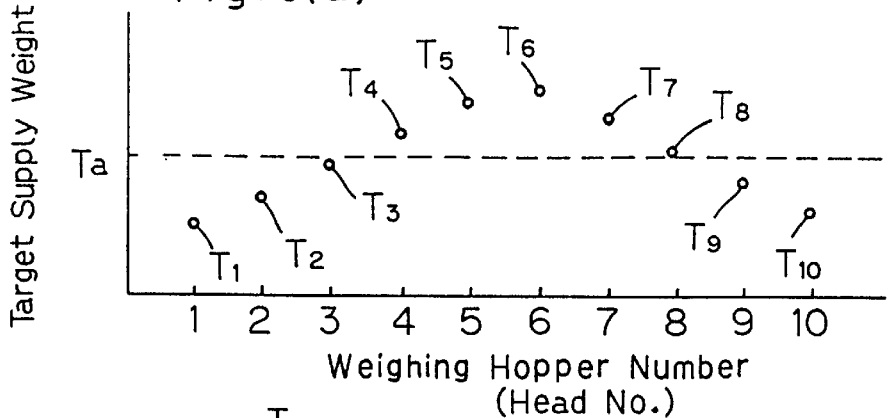
FIGS. 6(a) and 6(b) pertain to a modification of the first preferred embodiment of the present invention and altogether illustrate a schematic diagram showing the relationship between the target supply value and the measured weight (the weight of articles supplied into each weighing hopper) in the modified combinational weighing apparatus.
Figure 6B:
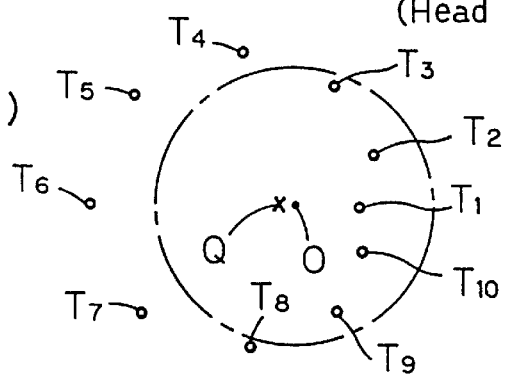

The weighing hoppers $6_1$ to $6_{10}$ are divided into a first hopper group including the weighing hoppers $6_1$ to $6_3$, $6_9$ and $6_{10}$, each having a respective target supply value $T_1$ to $T_3$, $T_9$ and $T_{10}$ which is smaller than the average value $Ta=T_M/m$ of the target supply values shown in FIG. 6(a), and a second hopper group including the weighing hoppers $6_4$ to $6_8$ each having a respective target supply value $T_4$ to $T_8$ which is greater than the average value $Ta=T_M/m$ of the target supply values shown in FIG. 6(a), the weighing hoppers $6_1$ to $6_{10}$ of said first and second hopper groups being arranged circumferentially around the round dispensing feeder 2. As shown in FIG. 6(b), the first hopper group of the weighing hoppers $6_1$ to $6_3$, $6_9$ and $6_{10}$ having the smaller respective target supply values $T_1$ to $T_3$, $T_9$ and $T_{10}$ are positioned on a right-hand side with respect to the center 0 of the dispensing feeder 2 whereas the second hopper group of the weighing hoppers $6_4$ to $6_8$ having the greater respective target supply values $T_4$ to $T_8$ are positioned on a left-hand side with respect to the center 0 of the dispensing feeder 2. It is to be noted that the target supply values $T_1$ to $T_{10}$ have a relationship of $T_1<T_{10}<T_2<T_9<T_3<T_8<T_4<T_7<T_5<T_6$ and that the difference between every two of the target supply values which are numerically close to each other remains the same throughout the target supply values of the weighing hoppers. In other words, re-arrangement of the target supply values $T_1$ to $T_{10}$ results in the same pattern of the target supply values as shown in FIG. 1.

The point Q shown in FIG. 6 represents the coordinates where the articles M fall from the delivery conveyor 1 in FIG. 2 and is set at a position offset from the center 0 shown in FIG. 6(b) in a direction close towards the second hopper group of the weighing hoppers $6_4$ to $6_8$ each having the greater target supply value $T_4$ to $T_8$. For this reason, the delivery conveyor 1 allows the articles M, shown in FIG. 2, to fall onto the weighing hoppers in such a manner that the weighing hoppers $6_4$ to $6_8$ of the second hopper group having the greater target supply values $T_4$ to $T_8$ can receive a greater amount of the articles M than that received by the weighing hoppers $6_1$ to $6_3$, $6_9$ and $6_{10}$ of the first hopper group having the smaller target supply values $T_1$ to $T_3$, $T_9$ and $T_{10}$.

According to this modification, although the amount of supply of the articles M from the dispensing feeder 2 onto the driving feeders $3_i$ varies from one driving feeder to another, this amount of supply of the articles M can easily become equal to or generally equal to the target supply value $T_i$. Accordingly, the measured weight $W_i$ corresponding to the target supply value $T_i$ can be obtained easily.

In describing the foregoing modification of the present invention, reference has been made only to the point of fall of the articles M from the delivery conveyor 1. However, when the direction of flow of the articles M from the delivery conveyor 1 is approximately set, it will be appreciated that similar effects as described above in connection with the foregoing modification can be obtained even when the point of fall of the articles M is aligned with the center 0 of the dispensing feeder 2.

Figure 7A:
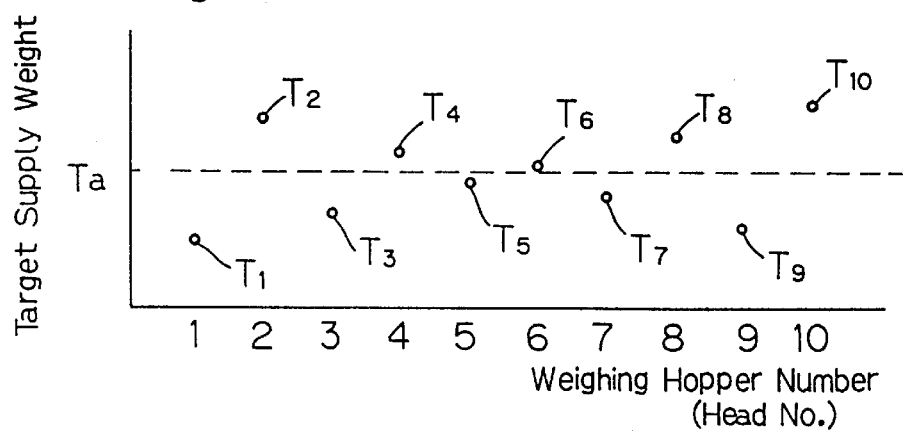
FIGS. 7(a) and 7(b) pertain to a further modification of the first preferred embodiment of the present invention and altogether illustrate a schematic diagram showing the relationship between the target supply value and the measured weight (the weight of articles supplied into each weighing hopper) in the further modified combinational weighing apparatus.
Figure 7B:
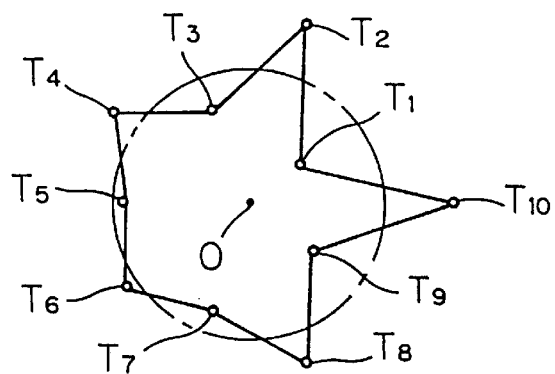

Referring now to FIG. 7(a), there is shown another modification of the present invention. According to this modification, the target supply values $6_i$ of the odd-numbered weighing hoppers $6_i$ are so chosen as to be smaller than the average value $Ta=T_M/m$ of the target supply values whereas the target supply values $6_i$ of the even-numbered weighing hoppers $6_i$ are so chosen as to be greater than the average value $Ta=T_M/m$ of the target supply values. In other words, the weighing hoppers $6_1$ to $6_n$ are so disposed around the round dispensing feeder 2 that the weighing hoppers $6_i$ having the smaller respective target supply values $T_i$ and the weighing hoppers $6_i$ having the greater respective target supply values $T_i$ alternate with each other circumferenitially of the dispensing feeder 2. It is to be noted that the target supply values $T_1$ to $T_{10}$ have a relationship of $T_1 < T_9 < T_3 < T_7 < T_5 < T_6 < T_4 < T_8 < T_9 < T_{10}$ and that the difference between every two of the target supply values which are numerically close to each other remains the same throughout the target supply values of the weighing hoppers. In other words, re-arrangement of the target supply values $T_1$ to $T_{10}$ shown in FIG. 7 results in the same pattern of the target supply values as shown in FIG. 1.

In the case of the modification shown in FIG. 7, it is preferred that the weighing hoppers each having a relatively large difference between the associated target supply value and the average weight Ta are neighboring with each other while the weighing hoppers each having a relatively small difference between the associated target supply value and the average weight Ta are neighboring with each other. In other words, the weighing hoppers $6_i$ having a relatively large value of $|T_i - T_a|$ are preferably neighboring with each other while the weighing hoppers $6_i$ having a relatively small value of $|T_i - T_a|$ are preferably neighboring with each other.

In the meantime, in the foregoing embodiment, the target supply value $T_i$ has been described as determined from the previously discussed equation (3) on the basis of the combined target supply value $T_M$, the ideal number m of the weighing hoppers to be combined and the total number n of the weighing hoppers to be used. It is, however, to be noted that, in accordance with the present invention, in place of the combined target weight $T_M$ and the ideal number m of the weighing hoppers, the average value Ta of the target supply values may be inputted to the target supply value calculating means 30 so that the latter can calculate the target supply value $T_i$ on the basis of the average weight Ta in place of $T_M/m$.

Figure 8:
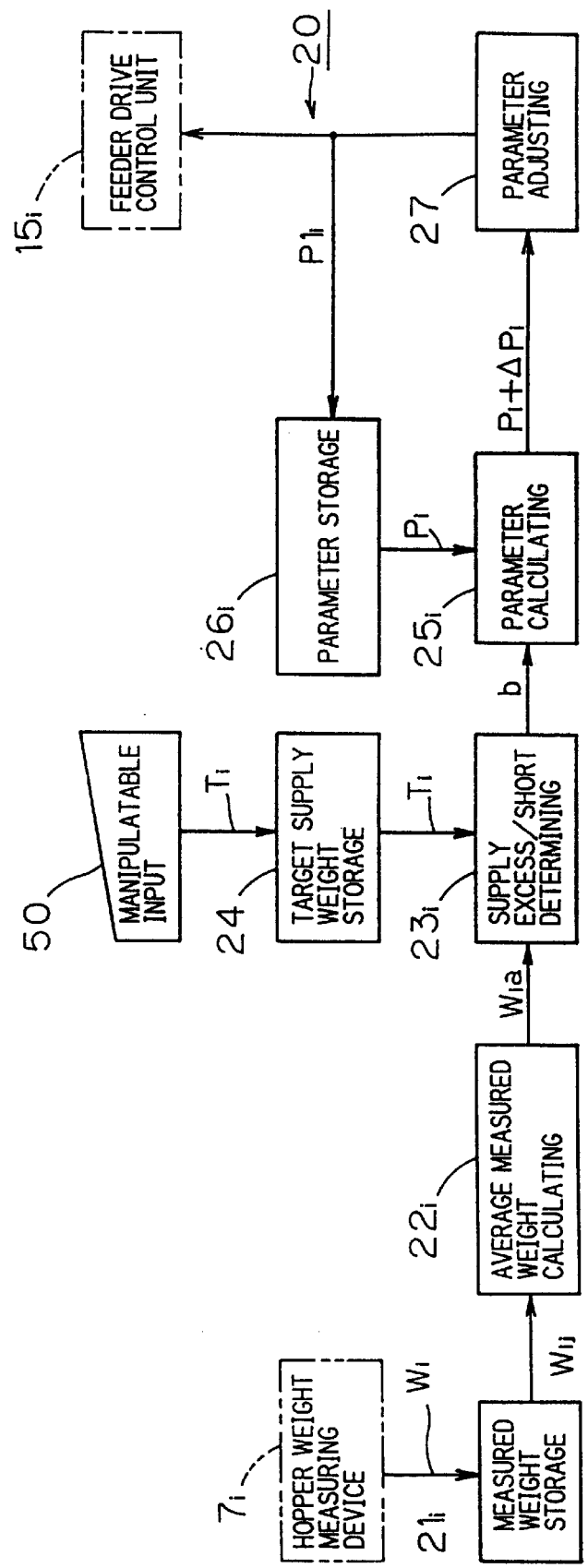
FIG. 8 is a block circuit diagram showing the combinational weighing apparatus according to the second preferred embodiment of the present invention.

A second preferred embodiment of the present invention is shown in FIG. 8. According to the second embodiment of the present invention shown in FIG. 8, the parameter setting means 20 is not provided with the target supply value calculating means 30, the inclination coefficient storage means 31, the target supply value control means 32 and the uppermost and lowermost limit value storage means 33 all of which have been described as employed in the parameter setting means 20 according to the foregoing embodiment of the present invention as shown in FIG. 4. Instead, in the second embodiment of the present invention shown in FIG. 8, the target supply value storage means 24 is connected to a manipulable input means 50 through which an operator can input the target supply value $T_i$. Other components of the parameter setting means 20 are substantially similar to those shown and described in connection with the foregoing first embodiment of the present invention and, therefore, like parts are designated by like reference numerals with no details of the like parts reiterated for the sake of brevity. It is to be noted that, in the practice of the second embodiment of the present invention, the operator has to calculate the target supply value $T_i$ for each weighing hopper $6_i$ making reference to the previously discussed equation (1) and then to manipulate the manipulable input means 50 to input the calculated target supply values $T_1$ to $T_n$ for the respective weighing hoppers $6_1$ to $6_n$ to the target supply value storage means 24.

A third preferred embodiment of the present invention will now be described with reference to FIG. 9 which illustrates a schematic structural diagram of the parameter setting means 20 (FIG. 3) designed according to the third embodiment of the present invention.

As shown in FIG. 9, as is the case with that employed in the first embodiment of the present invention, the parameter setting means 20 includes a number n of the measured weight storage means $21_i$, the average measured weight calculating means $22_i$ and the supply excess/short determining means $23_i$ in association with each weighing hopper. The measured weight storage means $21_i$ and the average measured weight calculating means $22_i$ are operable to supply the measured weight $W_{ij}$ and the average measured weight $W_{ia}$ to an actual standard deviation calculating means $40_i$, respectively.

The actual standard deviation calculating means $40_i$ for each weighing hopper calculates an actual standard deviation $\sigma_i$ by the use of the following equations (4) and (5) based on the measured weight $W_{ij}$ and the average measured weight $W_{ia}$:

$$\sigma_i^2 = Sw_i/N \tag{4}$$

$$Sw_i = \Sigma(W_{ij} - W_{ia})^2 \tag{5}$$

wherein $Sw_i$ represents the square sum of the balance.

The actual standard deviation calculating means $40_i$ constitutes, in the case of the illustrated embodiment, a deviation calculating means for calculating the magnitude of deviation of the measured weight $W_{i1}$ to $W_{iN}$, outputted from each weighing hopper $6_i$, on the basis of the associated weights $W_{i1}$ to $W_{iN}$ measured during the previous weighing cycles (N times) and outputs the actual standard deviation $\sigma_i$, actually determined for each weighing hopper $6_i$, to a target supply value control means 32B.

Based n the actual standard deviation $\sigma_i$ (the magnitude of deviation) as hereinabove described, and in a manner as will subsequently be described, the target supply value control means 32B calculates the coefficient A of inclination which is subsequently out-putted therefrom to the target supply value calculating means 30 to control the target supply value calculating means 30. In other words, the target supply value control means 32B determines an average value $\sigma a$ of the actual standard deviations $\sigma_1$ to $\sigma_n$ for the weighing hoppers $6_1$ to $6_n$ using the following equation (6) and also determines the coefficient A of inclination using the average standard deviation $\sigma a$ according to the following equation (7):

$$\sigma a = (\sigma_1 + \sigma_2 + \ldots \sigma_i + \ldots \sigma_n)/n \tag{6}$$

$$A = C_1 \cdot (C_2 - \sigma a) \tag{7}$$

wherein $\sigma a$ is smaller than $C_2$, $C_1$ represents a positive constant (for example, 1/5), $C_2$ represents a positive constant (for example, 6) and the coefficient A of inclination is equal to zero if $\sigma a$ is greater than $C_2$.

It is to be noted that, since the actual standard deviation $\sigma_i$ becomes small if the target supply value $T_i$ is small, compensation for the difference is carried out if required.

The target supply value calculating means 30 makes use of the coefficient A of inclination supplied from the target supply value control means 32B to calculate the target supply value $T_i$ according to the previously described equation (3) and then outputs the calculated target supply value $T_i$ to the target supply value storage means 24 for the storage thereof. Other structural features than those described above are substantially similar to those shown in and described in connection with the first preferred embodiment of the present invention and, therefore, the details are not herein reiterated for the sake of brevity while like parts are designated by like reference numerals.

According to this embodiment, when the average value σa of the actual standard deviations $\sigma_i$ is small, that is, when the deviation of the measured weights $W_{i1}$ to $W_{iN}$ of the respective weighing hoppers $6_i$ (shown in FIG. 2) is small, the coefficient A of inclination becomes great. Accordingly, it does hardly occur that the measured weights $W_1$ to $W_n$ outputted from the respective weighing hoppers $6_i$ to $6_n$ will take the same value, and therefore, the combinational selected weight Ws approximating to the combined target weight $T_M$ can be obtained easily.

On the other hand, when the average value σa of the actual standard deviations $\sigma_i$ is great, that is, when the deviation of the measured weights $W_{i1}$ to $W_{iN}$ of the respective weighing hoppers $6_i$ (shown in FIG. 2) is large, the coefficient A of inclination becomes small. Accordingly, even though the measured weights $W_i$ outputted from the respective weighing hoppers $6_i$ to $6_n$ will considerably deviate from the respective target supply value $T_i$, the possibility can be advantageously avoided in which the measured weight $W_i$ of such a small or great value that will not be used for the selection of the combination may be generated.

It is to be noted that, if the measured weights $W_{i1}$ to $W_{iN}$ for the respective weighing hoppers $6_i$ (shown in FIG. 2) deviate considerably largely, that is, if the average value σa shown in the equation (7) takes a value greater than 6, the coefficient A of inclination becomes zero. However, since in such case the measured weight $W_i$ takes a value deviated from the target supply value $T_i$, the measured weight $W_i$ can take various values even though the coefficient A of inclination is zero, and therefore, the measured weights $W_1$ to $W_n$ take respective values differing from each other.

In the meantime, in describing the foregoing embodiment of the present invention, the coefficient A of inclination has been shown and described as determined based on the average value σa of the actual standard deviations $\sigma_i$. However, the coefficient A of inclination may be determined using the minimum or maximum value of the actual standard deviations $\sigma_1$, to $\sigma_n$, or using a value such as a D value, as will be described later, representative of the magnitude of deviation other than the actual standard deviation $\sigma_i$.

A fourth preferred embodiment of the present invention will now be described with particular reference to FIG. 11 which schematically illustrates the parameter setting means 20 (FIG. 3) according to this fourth embodiment.

Figure 11:
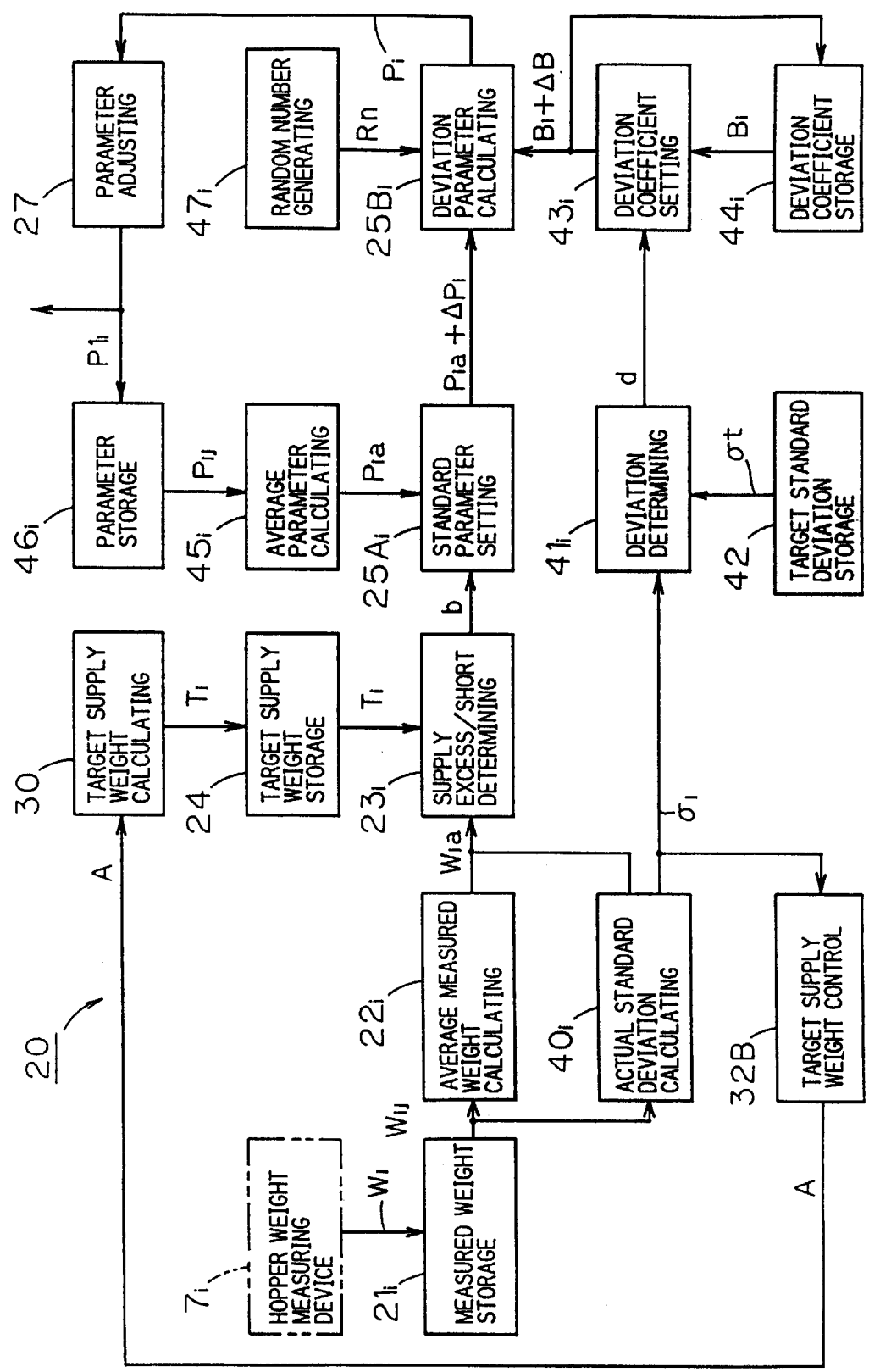
FIG. 11 is a block circuit diagram showing the parameter setting means employed in the combinational weighing apparatus according to the fourth preferred embodiment of the present invention.

As shown in FIG. 11, the parameter setting means 20 shown therein is similar to that employed in the practice of the third embodiment of the present invention and includes the measured weight storage means $21_i$, the average measured weight calculating means $22_i$, the supply excess/short determining means $23_i$, the actual standard deviation calculating means $40_i$, the target supply value control means 32B and the target supply value calculating means 30. The actual standard deviation calculating means $40_i$ associated with each weighing hopper $6_i$ outputs the respective actual standard deviation $\sigma_i$ to both of the target supply value control means 32B and the deviation determining means $41_i$.

Figure 10A:
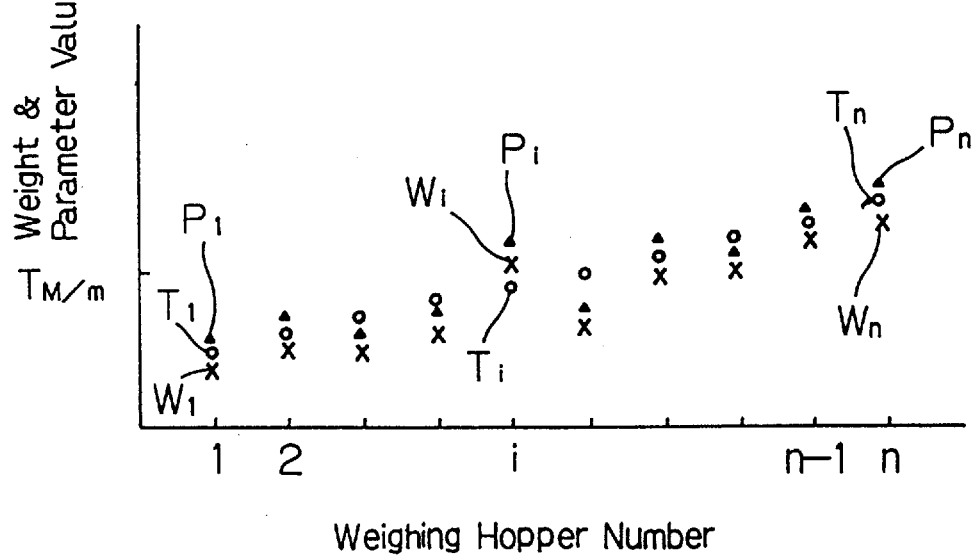
FIGS. 10(a) and 10(b) altogether illustrate schematic diagrams showing the relationship between the target supply value and the measured weight (the weight of articles supplied into each weighing hopper) in the combinational weighing apparatus according to a fourth preferred embodiment of the present invention.
Figure 10B:
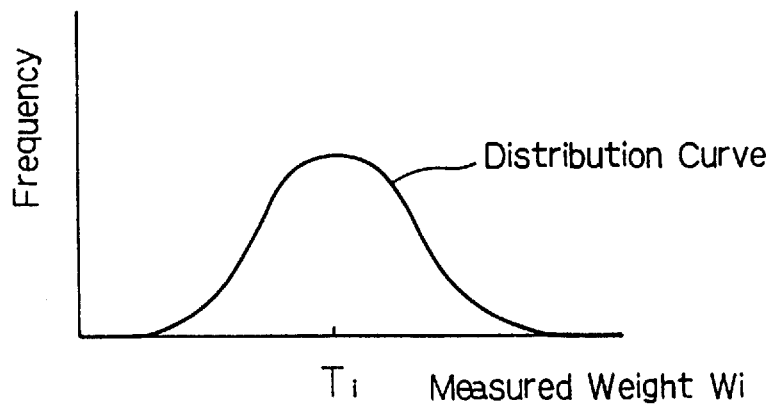

The deviation determining means $41_i$ reads out the target standard deviation σt, which has been inputted to and stored in a target standard deviation storage means 42, from such target standard deviation storage means 42 and then compare the actual standard deviation $\sigma_i$ with the target standard deviation σt so that it can be determined if the respective weights of the articles M supplied into the weighing hoppers $6_i$ are deviated from each other such as shown in a pattern of distribution of FIG. 10(b). In other words, the deviation determining means $41_i$ shown in FIG. 11 refers to the measured weights $W_{ij}$ outputted from each weighing hopper $6_i$ during the previous weighing cycles N-times preceding the current weighing cycle to determine for each weighing hopper $6_i$ if the magnitude of deviation of the measured weights $W_{ij}$ to $W_{iN}$ is excessive or short. The deviation determining means $41_i$ outputs a deviation excess/short signal d to a deviation coefficient setting means $43_i$ according to the magnitude of deviation so determined by the deviation determining means $41_i$.

The deviation coefficient setting means $43_i$ calculates a new deviation coefficient $B_i+\Delta B$ on the basis of the deviation coefficient $B_i$ for the previous weighing cycle, which is supplied from the deviation coefficient storage means $44_i$, and the deviation excess/short signal d outputted from the deviation determining means $41_i$. By way of example, should the actual standard deviation $\sigma_i$ be greater than the target standard deviation σt, the deviation coefficient setting means $43_i$ subtracts a single unit from the deviation coefficient $B_i$ for the previous weighing cycle to determine the new deviation coefficient $B_i+\Delta B$ (in such case, $\Delta B$ being a negative value), but should the actual standard deviation $\sigma_i$ be smaller than the target standard deviation σt, it adds a single unit to the deviation coefficient $B_i$ for the previous weighing cycle to determine the new deviation coefficient $B_i+\Delta B$ (in such case, $\Delta B$ being a positive value). The new deviation coefficient $B_i+\Delta B$ referred to above is supplied from the deviation coefficient setting means $43_i$ to both of the deviation coefficient storage means $44_i$ and a deviation parameter calculating means $25B_i$.

The supply excess/short determining means $23_i$ compares the target supply value $T_i$, supplied from the target supply value storage means 24, with the average measured weight $W_{ia}$ supplied from the average measured weight calculating means $22_i$ to provide a supply excess/short signal b to a standard parameter setting means $25A_i$.

The standard parameter setting means $25A_i$ referred to above is operable to calculate a new standard parameter $P_i a+\Delta P_i$ based on an average parameter $P_i a$, calculated by the average parameter calculating means $45_i$ during the previous weighing cycles (for example, during the weighing cycles preceding the current weighing cycle) and the supply excess/short signal b supplied from the supply excess/short determining means $23_i$. The average parameter $P_i a$ referred to above is a statistically averaged parameter of the parameters $P_{i1}$ to $P_{iN}$ calculated prior to the current weighing cycle with respect to the i-th driving feeder $3_i$ and is determined by the average parameter calculating means $45_i$ according to the following equation (8):

$$P_i a = (P_{i1} + P_{i2} + \ldots P_{ij} + \ldots P_{iN})/N \qquad (8)$$

It is to be noted that the parameters $P_{i1}$ to $P_{iN}$ calculated prior to the current weighing cycle are stored in the parameter storage means $46_i$ and are selectively read out by the average parameter calculating means $45_i$.

The deviation parameter calculating means $25B_i$ is adapted to receive the new standard parameter $P_i a+\Delta P_i$ from the corresponding standard parameter setting means $25A_i$, the new deviation coefficient $B_i+\Delta B$ from the previously discussed deviation coefficient setting means $43_i$ and a random number Rn from a random number generating means $47_i$ and calculates the parameter $P_i$ for the subsequent weighing cycle according to the following equation (9):

$$P_i = (P_i a + \Delta P_i) \cdot Rn \cdot (B_i + \Delta B) \qquad (9)$$

wherein the random number Rn is a number greater than zero, but smaller than 2 and has a deviation approximating to a normalized distribution with 1 taken as an arithmetic average value, and the new deviation coefficient $B_i+\Delta B$ is a positive value.

In other words, the deviation parameter calculating means $25B_i$ calculates the new parameter $P_i$ on the basis of the average parameter $P_ia+\Delta P_i$ and the magnitude of the deviation of the measured weights $W_{ij}$.

It is to be noted that other structures than those described above are similar to those shown and described in connection with the third embodiment of the present invention shown in FIG. 9 and, therefore, while the details thereof are not herein reiterated for the sake of brevity, like parts are designated by like reference numerals.

If the driving feeders $3_i$ are driven according to the new standard parameter $P_ia+\Delta P_i$ calculated according to the equation (9) discussed above, there may be the articles M which allow the measured weight $W_i$ for each weighing hopper $6_i$ to take a value very close to the target supply value $T_i$. This type of articles M results in the calculated combination weight $W_M$ taking a diverting value and, for this reason, it may occur that no selected combination weight Ws close to the target combined value $T_M$ can be obtained.

In contrast thereto, according to the fourth preferred embodiment of the present invention, since the new parameter $P_i$ is calculated by multiplying the standard parameter $P_i+\Delta P_i$ by the random number $Rn\cdot(B_i+\Delta B)$, the new parameter $P_i$ will not take a value corresponding to the target supply value $T_i$ as shown in FIG. 10(a). Because of this feature, even the actual supply amount $W_i$ having a correlation that is generally proportional to the new parameter $P_i$ can positively take a value diverting from the target supply value $T_i$. Accordingly, the calculated combination weight $W_M$ that can be obtained by combining an arbitrarily chosen number m of the measured weights $W_i$ can take a varying value and, therefore, a combinational weighing result close to the target combined value $T_M$ can be obtained.

On the other hand, if the standard parameter $P_i+\Delta P_i$ is multiplied by the random number Rn that is not controlled in any way, and should the random number Rn considerably varies n a relatively wide range, the measured weight $W_i$ may take a null value (indicative of an occurrence of the empty weighing hopper $6_i$) or the excessively loaded weighing hopper $6_i$ which can hardly be selected for the combination may occur.

In contrast thereto, according to the fourth embodiment of the present invention, the deviation determining means $41_i$ determines the magnitude of deviation from the weights $W_{ij}$ measured prior to the current weighing cycle and, based on the result of determination given by the deviation determining means $41_i$, the deviation coefficient setting means $43_i$ modifies the deviation coefficient $B_i$ for the previous weighing cycle to provide the new deviation coefficient $B_i+\Delta B$. Accordingly, as shown in FIG. 10(b), the measured weights $W_{ij}$ to $W_{iN}$ for the respective weighing hoppers $6_i$ can easily take respective values varying as shown in the pattern of distribution of FIG. 10(b) and, also, the possibility that the empty or excessively loaded weighing hopper $6_i$ may occur is advantageously minimized.

Although in the practice of the fourth embodiment of the present invention the target standard deviation σt has been described as being equal for all of the weighing hoppers $6_i$ to $6_n$, the target standard deviation σt may be of a value differing from one weighing hopper $6_i$ to another weighing hopper $6_i$. By way of example, the target standard deviation σ$t_i$ may be registered in terns of a function including the target supply value $T_i$ as an independent valuable. In such case, the target standard deviation σ$t_i$ may be automatically updated with a change of the target supply value $T_i$.

Figure 12:
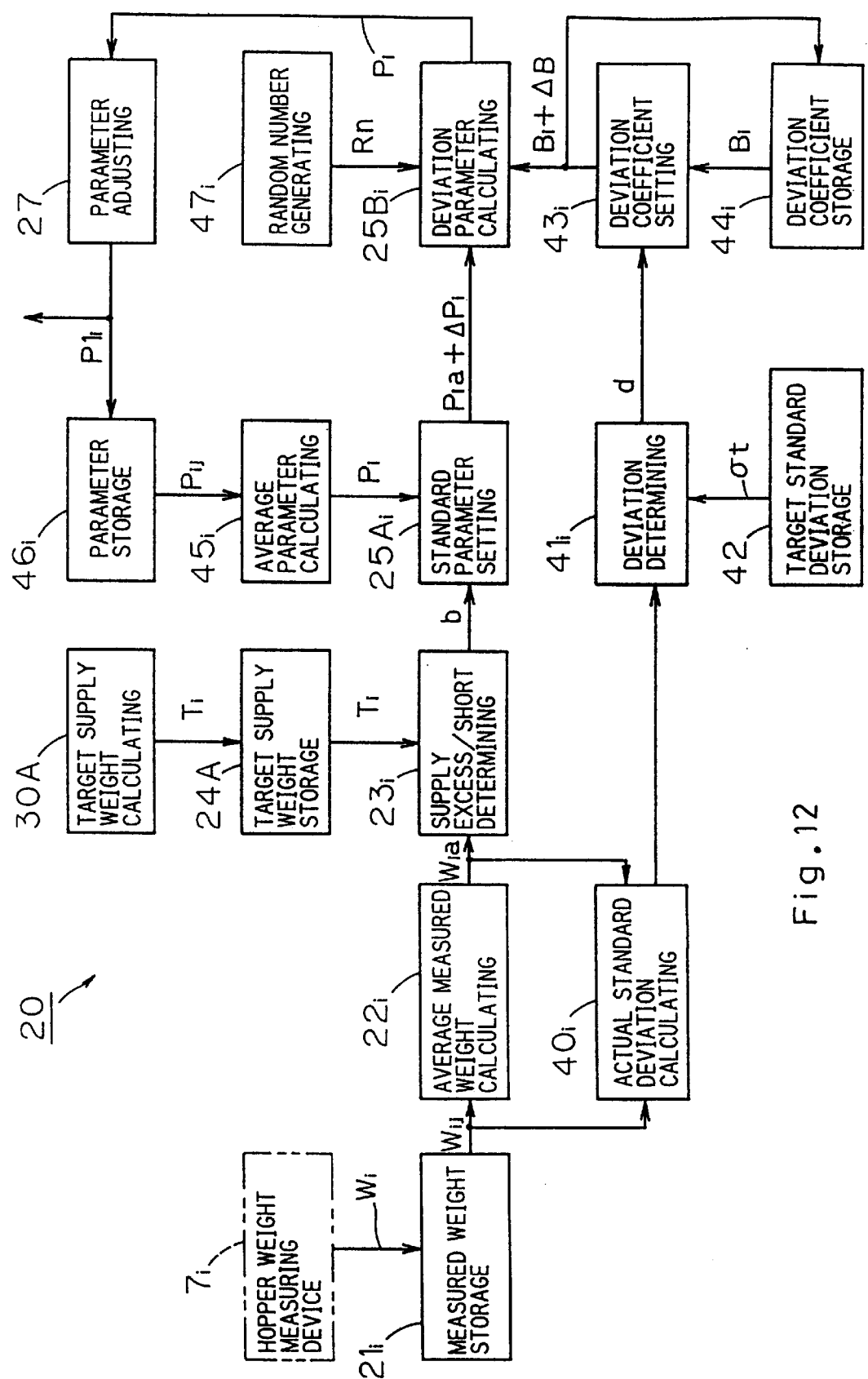
FIG. 12 is a block circuit diagram showing the parameter setting means employed in the combinational weighing apparatus according to a fifth preferred embodiment of the present invention.
Figure 14:
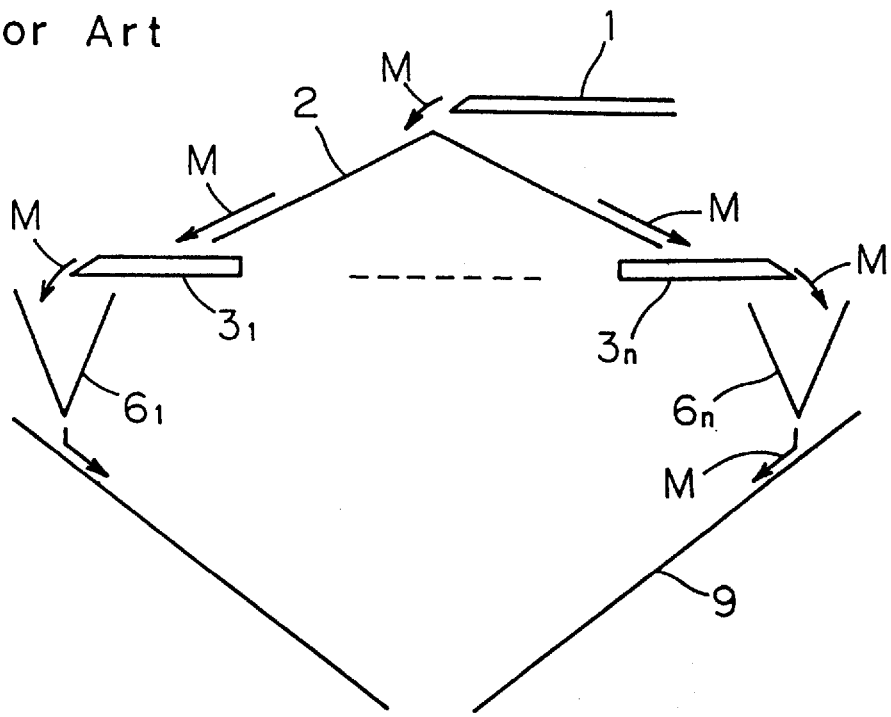
FIG. 14 is a diagram showing a concept of the mechanical structure of the combinational weighing apparatus.
Figure 15:
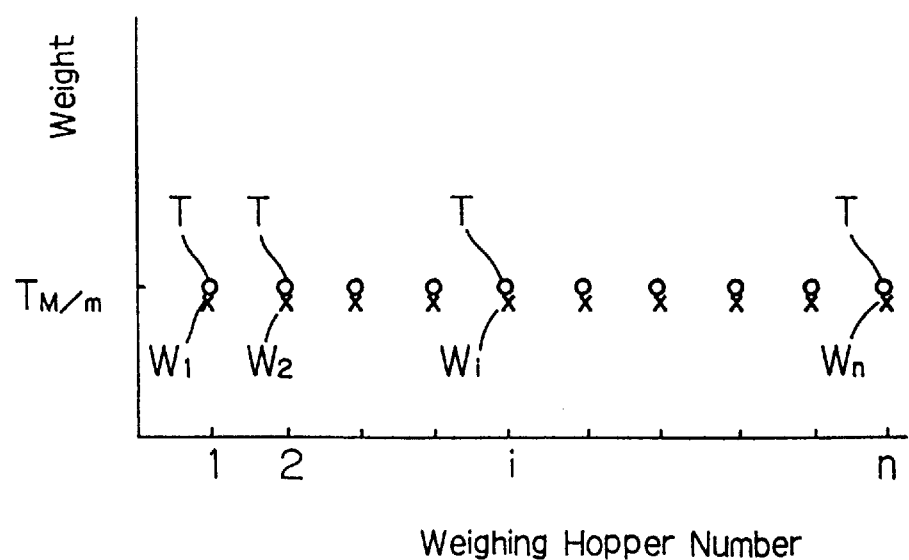
FIG. 15 is a graph showing the relationship between the target supply value and the measured weight (the weight of articles supplied into each weighing hopper) in the prior art combinational weighing apparatus.

Referring now to FIG. 12, a fifth preferred embodiment of is the present invention will be described. The parameter setting means 20 shown therein includes such component means as shown by the solid lines in FIG. 12. The measured weight storage means $21_i$ receive the respective measured weights $W_i$ fed from the corresponding hopper weight measuring devices $7_i$ and store the measured weights $W_{i1}$ to $W_{iN}$ measured during the N cycles preceding the current cycle. In other words, the measured weight storage means $21_i$ store, as shown in FIG. 13(a), the measured weights $W_{i1}$ to $W_{iN}$ measured by the associated hopper weight measuring devices $7_i$ during the first to N-th cycles prior to the current cycle.

The deviation determining means $41_i$ reads out the target standard deviation σt inputted to and stored in the target standard deviation storage means 42 and compares the target standard deviation σt with the actual standard deviation $σ_i$ to determine if the weights of the articles M supplied into the weighing hoppers $6_i$ vary as shown by a pattern of distribution shown in FIG. 1(d).

Unlike the fourth embodiment of the present invention described hereinbefore, the target supply value storage means 24A employed in the fifth embodiment of the present invention supplies the same target supply value T for all of the weighing hoppers $6_i$ to $6_n$ to the supply short/excess determining means $23_i$. The target supply value T is determined by the target supply value calculating means 30A by dividing the target combined value $T_M$ by the hopper number m and is stored in the target supply value storage means 24A.

The standard parameter setting means $25A_i$ performs the equation (8) referred to hereinbefore to determine the previous average parameter $P_ia$ (calculated, for example, until the preceding cycle) supplied from the average parameter calculating means $45_i$.

A new standard parameter $P_ia+\Delta P_i$ is determined, for example, by the following manner. If the average measured weight $W_{ia}$ is greater than the target supply value T, the standard parameter setting means $25A_i$ subtracts one unit from the average parameter $P_ia$ calculated according to the equation (8) to determine the new standard parameter $P_ia+\Delta P_i$ (in such case, $\Delta P_i$ is a negative value), whereas if the average measured weight $W_{ia}$ is smaller than the target supply value T, the standard parameter setting means $25A_i$ adds one unit to the average parameter $P_ia$ calculated according to the equation (8) to determine the new standard parameter $P_ia+\Delta P_i$ (in such case, $\Delta P_i$ is a positive value). The new standard parameter $P_ia+\Delta P_i$ is outputted from the standard parameter setting means $25A_i$ to the deviation parameter calculating means $25B_i$.

The deviation parameter calculating means $25B_i$ calculates the parameter $P_i$ for the subsequent weighing cycle according to the previously discussed equation (9).

In this system, when the driving feeders $3_i$ are driven according to the new standard parameter $P_ia+\Delta P_i$, there are the articles M which cause the measured weights $W_i$ thereof approximate to the target supply value T. This type of the articles M results in scattering combinational calculated weights $W_M$ and, for this reason, it may happens that no combination selected weight $W_S$ close to the target combined value $T_M$ can be obtained.

In contrast thereto, with the combinational weighing apparatus according to the fifth preferred embodiment of the present invention described hereinabove, since as shown by the equation (9) the new parameter $P_i$ is determined by multiplying the standard parameter $P_ia+\Delta P_i$ by a random number $Rn\cdot(B_i+\Delta B)$, the new parameter $P_i$ does not take a value corresponding to the target supply value T as shown in FIG. 1(c). For this reason, the actual supply weights $W_i$ which is substantially proportional to the new parameter $P_i$ are apt to take varying values relative to the target supply value T. Accordingly, the combinational calculated weights $W_M$ obtained by combining an arbitrarily chosen number m of the measured weights $W_i$ can take various values and, therefore, the result approximating to the target combined value $T_M$ can be obtained.

On the other hand, if the standard parameter $P_i a + \Delta P_i$ shown in FIG. 12 is multiplied by a nonl-controlled random number Rn, if the random number Rn deviates in a relatively large range, it may occur that some measured weights $W_i$ will become zero or that some of the weighing hoppers $6_i$ which are excessively loaded will no longer be available for the combination will occur.

In contrast thereto, the combinational weighing apparatus according to this embodiment of the present invention, the use has been made of the deviation determining means $41_i$ to determine the degree of deviation on the basis of the measured weights $W_{i1}$ to $W_{iN}$ calculated up until the preceding weighing cycle and, based on the result of determination done by the deviation determining means $41_i$, the deviation coefficient setting means $43_i$ modifies the deviation coefficient $B_i$ for the previous weighing cycle to provide the new deviation coefficient $B_i + \Delta B$ and multiplies the standard parameter $P_i a + \Delta P_i$ by a controlled random number $Rn \cdot (B_i + \Delta B)$ to provide a new parameter $P_i$. Accordingly, as shown by the pattern of distribution in FIG. 1(d), the measured weights $W_{i1}$ to $W_{iN}$ of the respective weighing hoppers $6_i$ are apt to properly vary and there is no possibility of some of the weighing hoppers $6_i$ being excessively loaded or emptied.

While in describing any one of the foregoing preferred embodiments of the present invention, reference has been made to the combinational weighing apparatus in which the target supply value $T_i$ is taken as a target weight, the present invention should be understood as equally applicable to a combinational counting apparatus wherein the target supply value $T_i$ is taken as a target number of articles.

In such combinational counting apparatus, the number of the articles M held in the weighing hoppers $6_i$ is detected by measuring the weight of the articles M therein, and an appropriate combination of the weighing hoppers $6_i$ is chosen so as to obtain a combined number of the articles M equal to the target combined count or within the allowance.

Also, although the combinational weighing apparatus according to any one of the foregoing embodiments of the present invention has been shown as provided with a parameter adjusting means 27, the use of the parameter adjusting means 27 is not always essential in the practice of the present invention and can therefore be dispensed with.

Again, in any one of the foregoing embodiments of the present invention, as shown by the equation (2) discussed hereinbefore, the average measured weight $W_i a$ has been determined by arithmetically averaging the weights $W_{i1}$ to $W_{iN}$ measured N times prior to the preceding weighing cycle. However, the average measured weight $W_i a$ may be employed in the form of, not the arithmetically averaged value, any average value such as, for example, the weighed average value in which weight $W_{ij}$ measured immediately before the current weighing cycle is weighed largely.

Furthermore, in any one of the foregoing embodiments of the present invention, it has been shown and described that the parameter $P_i$ is updated for each combinational weighing operation by determining the average measured weight $W_i a$ for the N times immediately before the preceding weighing cycle, that is, by determining a moving average. However, in the practice of the present invention, the updating of the parameter $P_i$ may be carried out periodically once in N cycles of combinational weighing operation. Yet, in any one of the embodiments shown in FIGS. 4 and 8, respectively, the average measured value $W_i a$ may not be always determined.

Moreover, in any one of the first to fourth embodiments of the present invention, it has been shown and described that the average value Ta of the target supply values $T_1$ to $T_n$ has been determined by the equation, $Ta = T_M/m$. However, in the practice of the present invention, the average value Ta of the target supply values $T_i$ may be determined by calculation $Ta = (T_M + \Delta T)/m$. Similarly, in the practice of the fifth preferred embodiment of the present invention shown in FIG. 12, the target supply value T may be determined by the equation, $T = (T_M + \Delta T)/m$.

In describing the fifth preferred embodiment of the present invention, it has been described that the target supply value calculating means 30A determines the target supply value T on the basis of the target combined value $T_M$ and the ideal number m of the weighing hoppers to be combined. However, in the practice of the fifth preferred embodiment of the present invention, instead of the target combined value $T_M$ and the ideal hopper number m, the target combined value T may be inputted directly to and stored in the target supply value storage means 24A.

Although in any one of the first to fourth embodiments of the present invention the target supply values $T_1$ to $T_n$ have been linearly varied, the target supply values $T_1$ to $T_n$ need not always be varied linearly. In other words, while according to the equation (3) discussed hereinbefore the target supply value $T_i$ has been determined as a linear function of the number i of the associated weighing hopper, the target supply value $T_i$ may be determined as a second or higher-order function of the number i of the associated weighing hopper. In addition, although the target supply values $T_1$ to $T_n$ have been shown and described as having different values, some of the target supply values $T_i$ may be set to have the same value.

Furthermore, although in the fourth and fifth embodiments shown in and described with reference to FIG. 11 and FIG. 12, respectively, the magnitude of deviation of the measured weights $W_{ij}$ has been determined by the use of the actual standard deviation $\sigma_i$, the use may not be always made of the actual standard deviation $\sigma_i$ in the determination of the magnitude of deviation of the measured weights $W_{ij}$. By way of example, the use may be made of such a value as $D = \Sigma |W_{ij} - W_{i(j-1)}|/(n-1)$ for the standard deviation $\sigma_i$ in determining the magnitude of deviation referred to above.

In addition, in the embodiment discussed above, the random number Rn used in the equation (9), any other random number such as a uniform random number than the normalized random number may be employed as generated from the random number generating means $47_i$.

The present invention has been described in connection with the preferred embodiments thereof with reference to the accompanying drawings. It is, however, to be noted that various changes and modifications are apparent to those skilled in the art within the fiamework of disclosure made herein and, therefore, such changes and modifications are to be understood as included within the scope of the present invention as defined by the appended claims, unless they depart therefrom.

What is claimed is:

1. A combinational weighing or counting method which comprises the steps of:
   driving a plurality of driving feeders for supplying articles from an upstream side into a plurality of weighing hoppers according to a predetermined parameter for controlling a supply ability of the driving feeder;
   determining a new parameter for each of the driving feeders on the basis of a target supply value for each weighing hopper, to which the respective weighing hopper is supplied with the articles, and a measured weight of the articles supplied into each weighing hopper; and
   selecting a combination of the articles on the basis of the measured values and a target combined value, some or all of the target supply values for the respective weighing hoppers being chosen to be of values different from each other so that some or all of the measured weights of the articles in the weighing hoppers fall in values different from each other.

2. A combinational weighing or counting apparatus comprising:
   a plurality of weighing hoppers;
   a plurality of driving feeders for supplying articles from an upstream side towards the corresponding weighing hoppers;
   a feeder drive control for driving the driving feeders for supplying articles to the weighing hoppers according to predetermined parameter;
   a parameter setting means for setting a new parameter for each of the driving feeders on the basis of a target supply value for each weighing hoper, to which the respective weighing hopper is supplied with the articles, and a measured weight of the articles supplied into each weighing hopper;
   a combination control means for selecting a combination of the measured weights of the articles supplied into the weighing hoppers on the basis of the measured values and a target combined value; and
   a target supply value calculating means for setting some or all of the target supply values for the respective weighing hoppers to be of values different from each other so that some or all of the measured weights of the articles in the weighing hoppers fall in values different from each other.

3. A combinational weighing or counting method which comprises the steps of:
   driving a plurality of driving feeders for supplying articles from an upstream side into a plurality of weighing hoppers according to a predetermined parameter for controlling a supply ability of the driving feeder;
   determining a new parameter for each of the driving feeders on the basis of a target supply value for each weighing hopper, to which the respective weighing hopper is supplied with the articles, and a measured weight of the articles supplied into each weighing hopper; and
   selecting a combination of the articles on the basis of the measured values and a target combined value, all of the target supply values for the respective weighing hoppers being chosen to be of values different from each other, wherein all of the target supply values $T_i$ to $T_n$ are of the values different from each other and determined so as to satisfy the following relationship;

$$T_{i+1} - T_i = T_1 - T_{i-1}$$

wherein $T_i$ represents a target supply value to which an arbitrarily chosen number of the weighing hoppers is supplied with the articles and $T_{i+1}$ and $T_{i-1}$ represent target supply values greater and smaller, respectively, than the target supply value $T_i$ and closest to the target supply value $T_i$.

4. A combinational weighing or counting apparatus comprising:
   a plurality of weighing hoppers;
   a plurality of driving feeders for supplying articles from an upstream side towards the corresponding weighing hoppers;
   a feeder drive control for driving the driving feeders for supplying articles to the weighing hoppers according to a predetermined parameter;
   a parameter setting means for setting a new parameter for each of the driving feeders on the basis of a target supply value for each weighing hopper, to which the respective weighing hopper is supplied with the articles, and a measured weight of he articles supplied into each weighing hopper;
   a combination control means for selecting a combination of the measured weights of the articles supplied into the weighing hoppers on the basis of the measured values and a target combined value; and
   a target supply value calculating means for setting all of the target supply values for the respective weighing hoppers to be of values different from each other, wherein all of the target supply values $T_i$ to $Y_n$ are of values different from each other and wherein the target supply value calculating means determines target supply values $T_i$ to $T_n$ for the respective weighing hoppers so as to satisfy the following relationship:

$$T_{i+1} - T_i = T_{i-1}$$

wherein $T_i$ represents a target supply value to which an arbitrarily chosen number of the weighing hoppers is supplied with the articles and $T_{i+1}$ and $T_{i-1}$ represent target supply values greater and smaller, respectively, than the target supply value $T_i$ and closest the target supply value $T_i$.

5. The combinational weighing or counting apparatus as claimed in claim 2, further comprising a target supply value control means for controlling the target supply value calculating means on the basis of the measured weights of the articles in the weighing hoppers so as to minimize the probability that the weight of the articles subsequently supplied into the respective weighing hopper may become zero.

6. A combinational weighing or counting apparatus comprising:
   a plurality of weighing hoppers;
   a plurality of driving feeders for supplying articles from an upstream aide towards the corresponding weighing hoppers;
   a feeder drive control for driving the driving feeders for supplying articles to the weighing hoppers according to a predetermined parameter;
   a parameter setting means for setting a new parameter for each of the driving feeders on the basis of a target supply value for each weighing hopper, to which the respective weighing hopper is supplied with the articles, and a measured weight if the articles supplied into each weighing hopper;
   a combination control means for selecting a combination of the measured weights of the articles supplied into the weighing hoppers on the basis of the measured values and a target combined value;

a target supply value storage means for storing the target supply value for each weighing hopper, and a target supply calculating means for calculating the target supply value for each weighing hopper on the basis of the target combined value so that some or all of the measured weights of the articles in the weighing hoppers fall in values different from each others.

7. The combinational weighing or counting apparatus as claimed in claim 6, wherein the target supply value calculating means comprises means for calculating the target supply value for each weighing hopper on the basis of an average value of the target supply values for the respective weighing hoppers and for outputting the calculated target supply value to the target supply value storage means for storage thereof in such target supply value storage means.

8. The combinational weighing or counting apparatus as claimed in claim 6, wherein said target supply value storage means includes a manipulable input means with which an operator inputs the target supply value.

9. The combinational weighing or counting apparatus as claimed in claim 6, wherein the target supply value calculating means comprises means for calculating the target supply value for each weighing hopper and for storing the calculated target supply value in the target supply value storage means; and further comprising:

a deviation calculating means for calculating a degree of deviation in measured weight of each weighing hopper on the basis of the measured weights of the articles which have previously been supplied into the weighing hoppers during previous weighing cycles; and a target supply value control means for controlling the target value calculating means on the basis of the degree of deviation.

10. The combinational weighing or counting apparatus as claimed in claim 2, wherein the weighing hoppers includes a first group of the weighing hoppers having a relatively great target supply value and a second group of weighing hoppers having a relatively small target supply values, said first and second groups of the weighing hoppers being disposed around a periphery of a circular dispensing feeder, and further comprising a delivery conveyor supplying by gravity the articles to the dispensing feeder so that the articles are supplied into the first group of the weighing hoppers in a quantity greater than those supplied into the second group of the weighing hoppers.

11. The combinational weighing or counting apparatus as claimed in claim 6, wherein the weighing hoppers includes a first group of the weighing hoppers having a relatively great target supply value and a second group of weighing hoppers having a relatively small target supply values, said first and second groups of the weighing hoppers being disposed around a periphery of a circular dispensing feeder, and further comprising a delivery conveyor supplying by gravity the articles to the dispensing feeder so that the articles are supplied into the first group of the weighing hoppers in a quantity greater than those supplied into the second group of the weighing hoppers.

12. The combinational weighing or counting apparatus as claimed in claim 2, wherein the weighing hoppers includes a first group of the weighing hoppers having a relatively great target supply value and a second group of weighing hoppers having a relatively small target supply values, said weighing hoppers of said first and second groups being disposed alternately around a periphery of a circular dispensing feeder.

13. The combinational weighing or counting apparatus as claimed in claim 6, wherein the weighing hoppers includes a first group of the weighing hoppers having a relatively great target supply value and a second group of weighing hoppers having a relatively small target supply values, said weighing hoppers of said first and second groups being disposed alternately around a periphery of a circular dispensing feeder.

14. The combinational weighing or counting apparatus as claimed in claim 2, further comprising:

an average measured calculating means for calculating, for each of the weighing hoppers, an average value of the measured weights of the articles which have previously been supplied into the weighing hoppers during previous weighing cycles;

a standard parameter setting means for determining a standard parameter, which is used as a reference for a new parameter, on the basis of excess or shortage of the amount of supply of the articles determined as a result of comparison between the average measured value and the target supply value; and a deviated parameter calculating means for calculating, for each of the weighing hoppers, a new parameter having a deviation in reference to the standard parameter.

15. The combinational weighing or counting apparatus as claimed in claim 6, further comprising:

an average measured weight calculating means for calculating, for each of the weighing hoppers, an average value of the measured weights of the articles which have previously been supplied into the weighing hoppers during previous weighing cycles;

a standard parameter setting means for determining a standard parameter, which is used as a reference for a new parameter, on the basis of excess or shortage of the amount of supply of the articles determined as a result of comparison between the average measured value and the target supply value; and a deviated parameter calculating means for calculating, for each of the weighing hoppers, a new parameter having a deviation in reference to the standard parameter.

16. A combinational weighing or counting apparatus comprising:

a plurality of weighing hoppers;

a plurality of driving feeders for supplying articles from an upstream side towards the corresponding weighing hoppers;

a feeder drive control for driving the driving feeders for supplying articles of the weighing hoppers according to a predetermined parameter;

a parameter setting means for setting a new parameter for each of the driving feeders on the basis of the target supply value for each weighing hopper, to which the respective weighing hopper is supplied with the articles, and a measured weight of the articles supplied into each weighing hopper;

a combination control means for selecting a combination of the measured weights of the articles supplied into the weighing hoppers on the basis of the measured values and a target combined value; and an average measured value calculating means for calculating, for each of the weighing hoppers, an average value of the measured weights of the articles which have previously been supplied into the weighing hoppers during previous weighing cycles;

a standard parameter setting for determining a standard parameter, which is used as a reference for a new parameter, on the basis of excess or shortage of the amount of supply of the articles as a result of comparison between the average measured value and the target supply value;

a deviation determining means for determining, on the basis of the measured weights of the articles which have previously been supplied into the weighing hoppers during previous weighing cycles, excess or shortage of a degree of deviation of each of the measured weights; and a deviated parameter calculating means for calculating, for each of the weighing hoppers, a new parameter on the basis of the standard parameter and the excess or shortage of the degree of deviation so that some or all of the measured weights of the articles in the weighing hoppers all in values different from each other.

17. The combinational weighing or counting apparatus as claimed in claim 16, wherein the respective target supply values for the weighing hoppers are equal to each other.

* * * * *